(12) United States Patent
McMichael

(10) Patent No.: US 10,091,157 B2
(45) Date of Patent: Oct. 2, 2018

(54) SYSTEMS AND METHODS FOR TRANSMITTING AND DISPLAYING PRIVATE MESSAGE DATA VIA A TEXT INPUT APPLICATION

(71) Applicant: William McMichael, New York, NY (US)

(72) Inventor: William McMichael, New York, NY (US)

( * ) Notice: Subject to any disclaimer, the term of this patent is extended or adjusted under 35 U.S.C. 154(b) by 0 days.

(21) Appl. No.: 15/649,210

(22) Filed: Jul. 13, 2017

(65) Prior Publication Data
US 2017/0310633 A1 Oct. 26, 2017

Related U.S. Application Data

(63) Continuation of application No. 15/399,379, filed on Jan. 5, 2017.
(60) Provisional application No. 62/418,277, filed on Nov. 6, 2016, provisional application No. 62/275,125, filed on Jan. 5, 2016.

(51) Int. Cl.
*G06F 15/16* (2006.01)
*H04L 12/58* (2006.01)
*H04W 4/14* (2009.01)
*H04W 12/02* (2009.01)

(52) U.S. Cl.
CPC ............ *H04L 51/38* (2013.01); *H04L 51/046* (2013.01); *H04W 4/14* (2013.01); *H04W 12/02* (2013.01)

(58) Field of Classification Search
None
See application file for complete search history.

(56) References Cited

U.S. PATENT DOCUMENTS

| 8,233,887 | B2 | 7/2012 | Whitney et al. |
| 8,296,380 | B1 | 10/2012 | Kelly et al. |
| 8,626,848 | B2 | 1/2014 | Cohen et al. |
| 8,706,817 | B2 | 4/2014 | Daniels et al. |
| 8,782,799 | B2 | 7/2014 | Phillips et al. |

(Continued)

OTHER PUBLICATIONS

Team Giphy; "Giphy Now Available for Verizon Messages Users Everywhere—Start Sharing Today!" https://giphy.com/posts/giphy-now-available-for-verizon-messages-users-everywhere-start-sharing-today; Jun. 2, 2015.

*Primary Examiner* — Brian Whipple
(74) *Attorney, Agent, or Firm* — Carter, DeLuca, Farrell & Schmidt, LLP

(57) ABSTRACT

The present disclosure relates to systems and methods for transmitting and displaying private messages securely using a mobile device. The mobile device provides a user interface which is displayed on a mobile device while a messaging application is displayed on the mobile device's display. A private messaging applet runs within the keyboard region of a mobile device display, and receives and displays private messages from within the keyboard region of the mobile device display. The private message is displayed by initially obfuscating the entire message, and, based on detecting a user's contact with the display, displaying a smaller portion of the private message in relation to the location of the user's contact with the display. The private message is automatically deleted from the mobile device after the user removes contact with the display. The private messaging applet allows a user to remove a sent private message from a private messaging server.

21 Claims, 17 Drawing Sheets

(56) References Cited

U.S. PATENT DOCUMENTS

| | | |
|---|---|---|
| 8,849,931 B2 | 9/2014 | Linner et al. |
| 9,030,521 B2 | 5/2015 | Rossano et al. |
| 9,124,559 B2 | 9/2015 | DeLuca et al. |
| 9,185,062 B1 | 11/2015 | Yang et al. |
| 9,207,835 B1 | 12/2015 | Yang et al. |
| 9,235,711 B1 | 1/2016 | Xavier |
| 9,246,967 B2 | 1/2016 | Garmark et al. |
| 2004/0086095 A1 | 5/2004 | Dixit et al. |
| 2006/0041629 A1 | 2/2006 | Lira |
| 2006/0158460 A1* | 7/2006 | Uh .................. G06F 21/84 345/619 |
| 2009/0111487 A1 | 4/2009 | Scheibe |
| 2009/0172565 A1 | 7/2009 | Jackson et al. |
| 2009/0248751 A1 | 10/2009 | Myman et al. |
| 2010/0279720 A1 | 11/2010 | Schultz et al. |
| 2011/0138300 A1 | 6/2011 | Kim et al. |
| 2011/0298817 A1 | 12/2011 | Oshinome |
| 2012/0254770 A1 | 10/2012 | Ophir |
| 2014/0136990 A1 | 5/2014 | Gonnen et al. |
| 2014/0298197 A1 | 10/2014 | Kwon |
| 2015/0121248 A1 | 4/2015 | Levin et al. |
| 2015/0312180 A1 | 10/2015 | Taler |
| 2015/0326708 A1 | 11/2015 | Ginzburg |
| 2016/0006856 A1 | 1/2016 | Bruno |
| 2016/0014059 A1 | 1/2016 | Rathod |
| 2016/0301641 A1* | 10/2016 | Belliston ............... H04L 51/063 |
| 2017/0005957 A1* | 1/2017 | Han ................... H04L 51/04 |
| 2017/0083519 A1 | 3/2017 | Huang et al. |
| 2017/0083520 A1 | 3/2017 | Huang et al. |
| 2017/0083524 A1 | 3/2017 | Huang et al. |
| 2017/0083586 A1 | 3/2017 | Huang et al. |
| 2017/0131870 A1 | 5/2017 | Harper |
| 2017/0212892 A1 | 7/2017 | McIntosh et al. |

\* cited by examiner

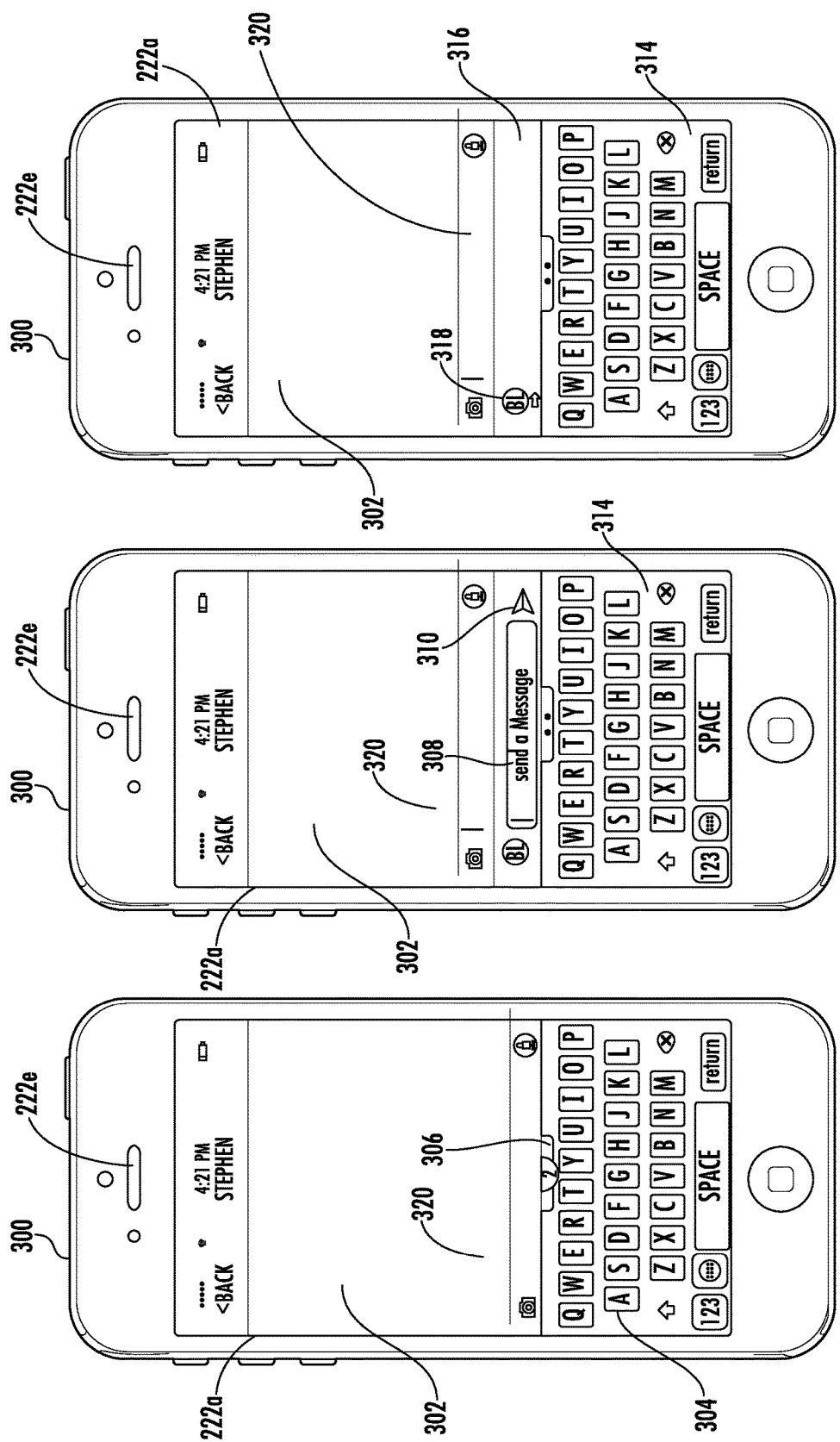

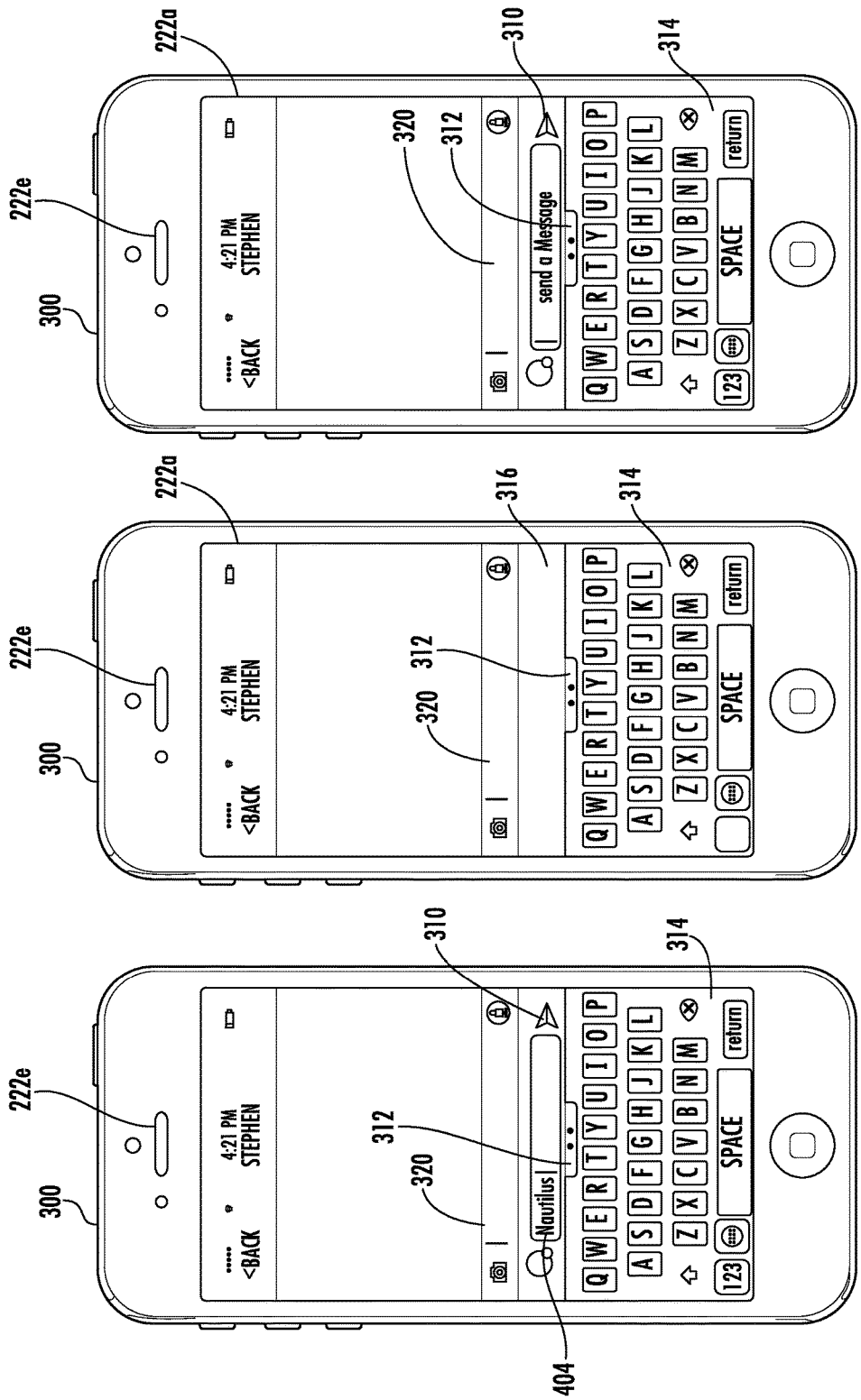

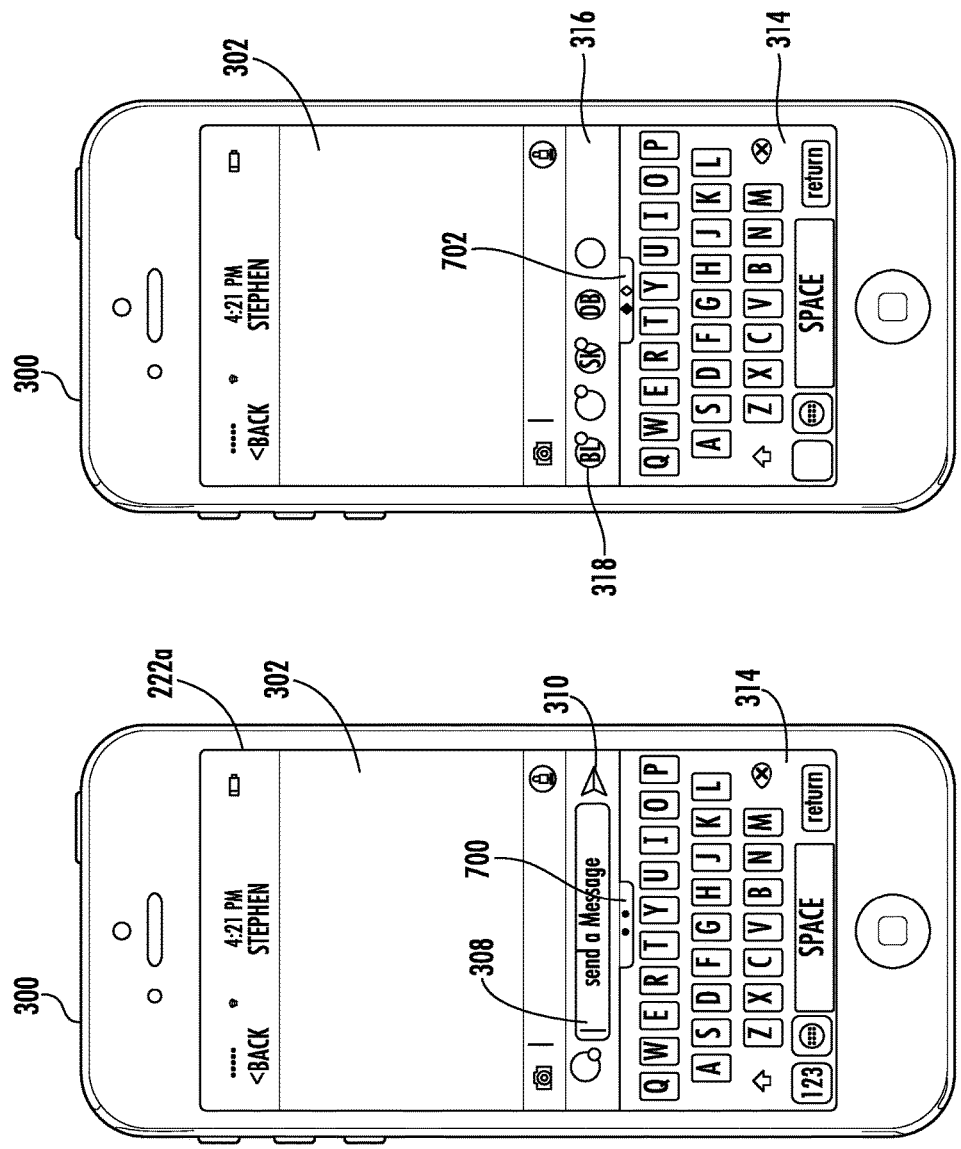

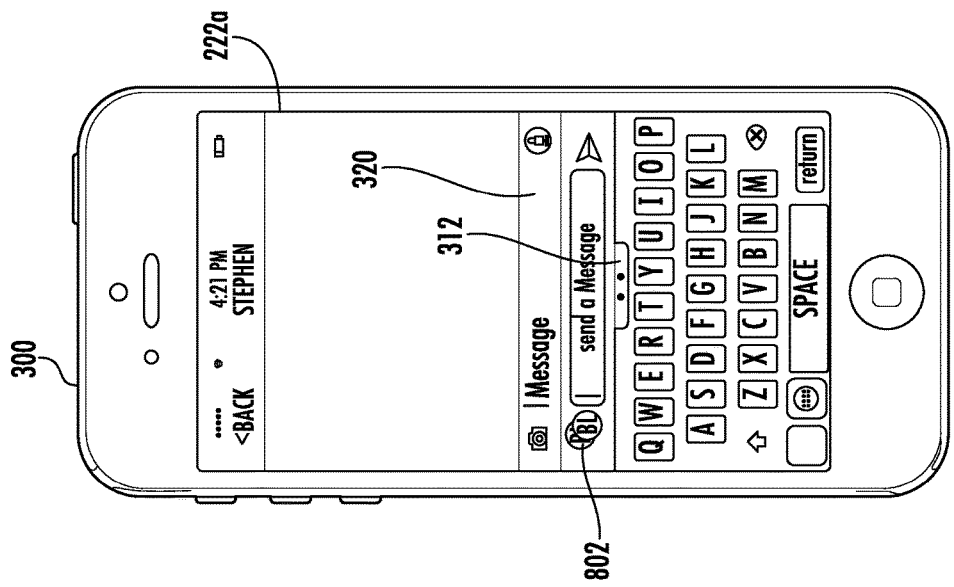
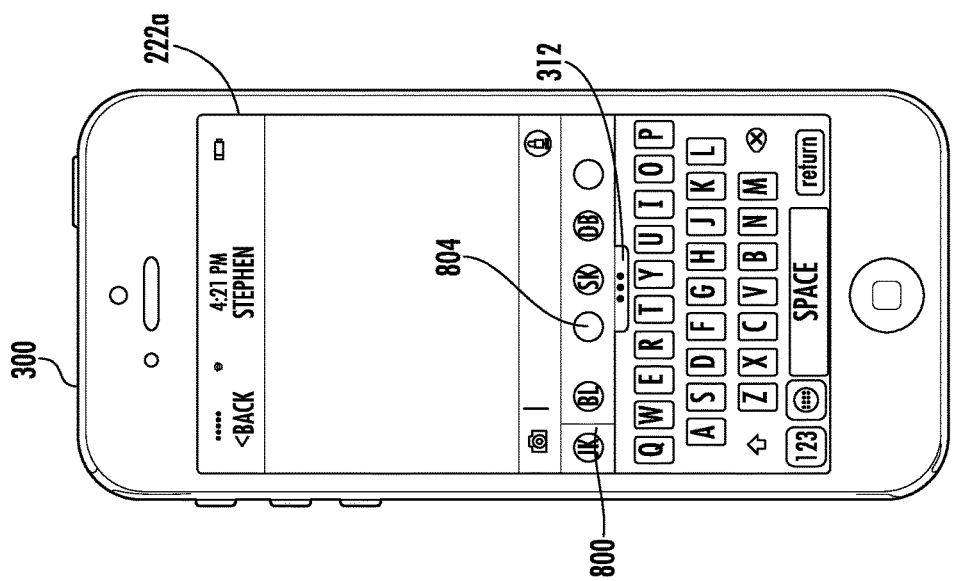
FIG. 8A
FIG. 8B

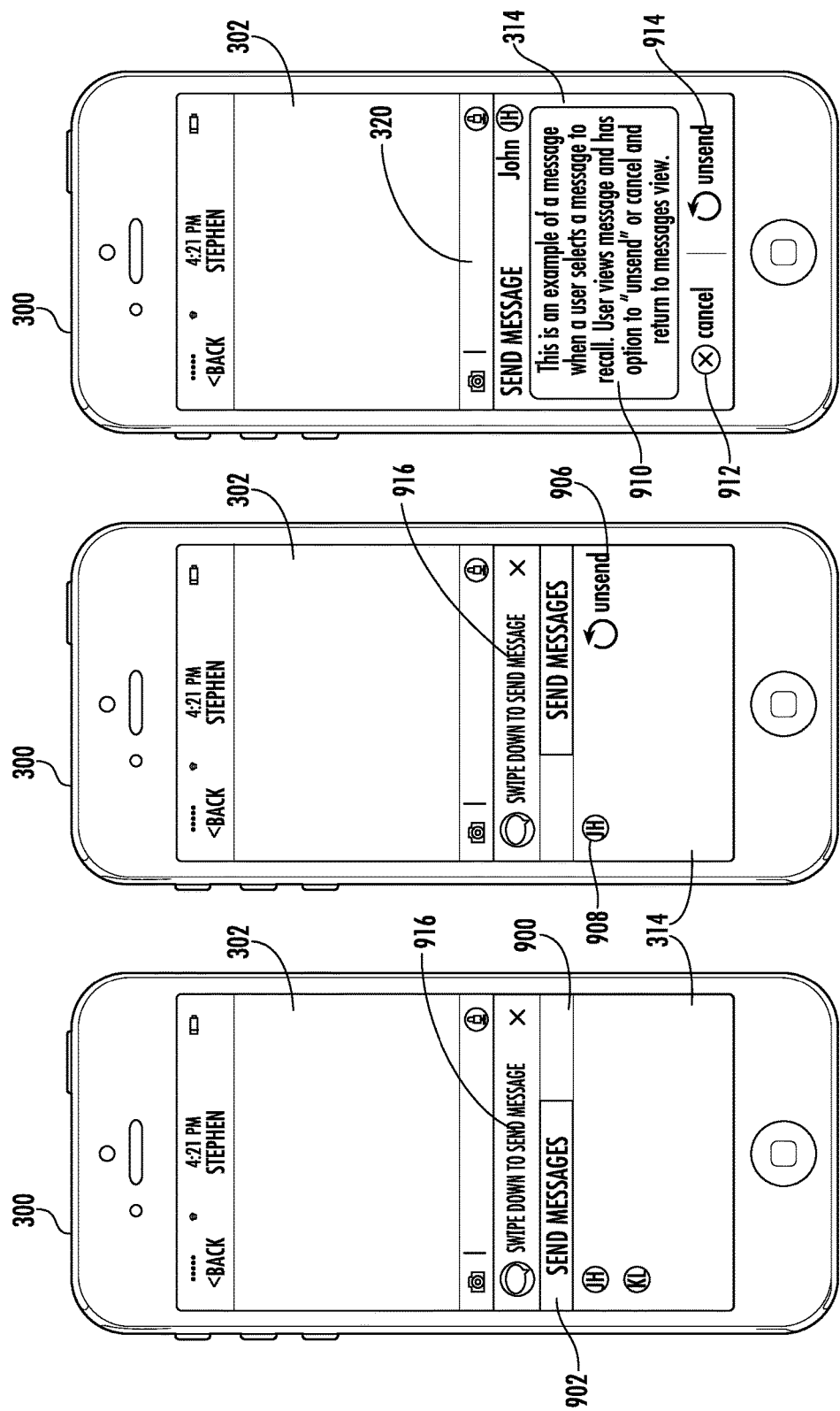

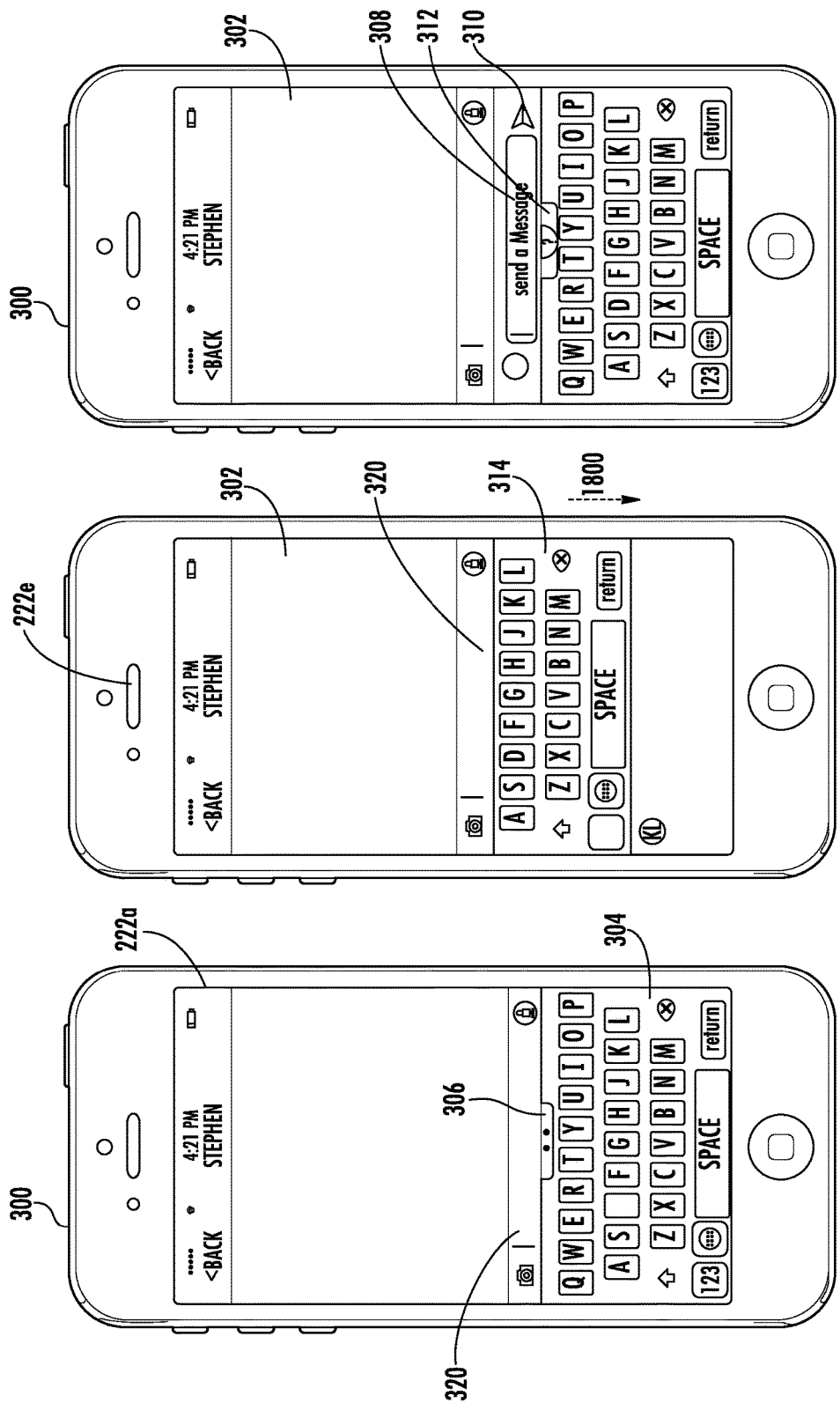

SYSTEMS AND METHODS FOR TRANSMITTING AND DISPLAYING PRIVATE MESSAGE DATA VIA A TEXT INPUT APPLICATION

TECHNICAL FIELD

The present disclosure generally relates to private messaging; more particularly, to systems and methods by which computing apparatuses compile, communicate, and display private message data within a virtualized keyboard of a messaging application.

BACKGROUND

Early implementation of data transfer between personal devices was initially limited to less than ten characters per character set. As personal device technology has advanced, messaging applications were developed to address user demand to send communications to additional users without entering into in-person conversations. Traditionally, these messages were transferred between parties, without being secured or encrypted in any fashion, due to computing constraints associated with devices as they originated and terminated the messages.

To facilitate interoperability between various service providers, protocols were developed, such as the Short Message Service (SMS) standard, and subsequently the Multimedia Messaging Service (MMS) standard. These protocols permitted transmission of finite character sets (for SMS) as well as small predefined multimedia files such as audio, video, and longer character sets than are supported by SMS.

More recent techniques allow for the digital renditions of the data prior to being output to a display or other device component to be secured and kept private. Delivery of message data either via SMS or MMS, however, generally requires displaying the transmitted message content on the display of a device. Such display methods may not adequately address the privacy concerns of individuals who prefer to keep the content of their conversations private while in the vicinity of other individuals.

SUMMARY

In addition to transmitting messaging data through service provider messaging applications, or default messaging applications provided with a device's operating system, users may also wish to transmit messages via applications that support secure delivery and display of the content within those messages. The technology of the present disclosure features a messaging system which permits a user to receive a message and obscure the message content from the display except for a minor portion of the message content while reviewing the message.

In aspects, the present disclosure features a method for collecting and transmitting private message data from within a messaging application. The method includes displaying, on a display of a communication apparatus, a messaging screen of a messaging application, the messaging screen including a private messaging button; detecting selection of the private messaging button; executing a private messaging application in response to detection of the private messaging button, the private messaging application including a private message field and a private messaging screen; receiving private message data entered into the private message field from another communication apparatus, the private message data including a tag indicating the message is private; displaying an indicator of the private message data received through the private messaging application; detecting selection of the indicator; displaying a private message contained in the private message data so that the displayed private message is obfuscated; continuously detecting display input, the display input including a display location; and displaying at or near the detected display location a portion of the private message corresponding to the display location, the portion of the private message unobfuscated.

In another aspect, the present disclosure features a method of performing private messaging on a computing device, which includes: displaying a user control for launching an application drawer; receiving user activation of the user control; displaying an application drawer including a private messaging application icon; launching a private messaging application in response to user selection of the private messaging application icon; receiving an alphanumeric message that has been tagged as being private from another computing device; displaying an indicator of the alphanumeric message received through the private messaging application; receiving user selection of the message indicator; displaying the message so that its contents are unreadable by the user or invisible to the user; detecting a user's selection of a portion of the unreadable or invisible contents; and displaying, at or near the user-selected portion of the unreadable or invisible contents, alphanumeric text corresponding to the user-selected portion of the unreadable or invisible contents.

In aspects, the method of performing private messaging on a computing device further includes receiving from the other computing device an instruction to delete the alphanumeric message from memory of the computing device prior to the intended recipient reading the message.

In aspects, the method of performing private messaging on a computing device further includes upon opening the drawer, displaying a list of private messaging contacts.

In aspects, the method of performing private messaging on a computing device further includes upon opening the drawer, displaying a listing of private messaging contacts.

In aspects, the method of performing private messaging on a computing device further includes displaying most recently contacted persons in the listing of contacts.

In aspects, the method of performing private messaging on a computing device further includes displaying recent-most contacts on the left-most side of the drawer.

In aspects, the method of performing private messaging on a computing device further includes launching another application from the application drawer; and displaying the another application over a keyboard frame of a user interface displayed on a display of the computing device.

In aspects, the method of performing private messaging on a computing device further includes launching another application from the application drawer; and displaying the another application in a portion of a user interface displayed on a display of the computing device.

In aspects, the method of performing private messaging on a computing device further defines the indicator as a numeric indicator showing the number of received private messages and wherein the numeric indicator is displayed over or near the user control for launching the application drawer.

In aspects, the method of performing private messaging on a computing device further defines the indicator as representing a message in a list of messages.

In aspects, the method of performing private messaging on a computing device further includes permanently deleting a private message once a user exits a display frame of the message.

In still another aspect, the present disclosure features a method for performing private messaging on a computing device, which includes: displaying a user control for launching an application drawer; receiving user activation of the user control; displaying an application drawer including a private messaging application icon; launching a private messaging application in response to user selection of the private messaging application icon; tagging an alphanumeric message as being private; and sending a private alphanumeric message to another computing device.

In aspects, a method for performing private messaging on a computing device further includes sending to the another computing device an instruction to delete the alphanumeric message from memory of the another computing device prior to the intended recipient reading the message.

In aspects, a method for performing private messaging on a computing device further includes, upon opening the drawer, displaying a listing of private messaging contacts.

In aspects, a method for performing private messaging on a computing device further includes displaying most recently contacted persons in the listing of contacts.

In aspects, a method for performing private messaging on a computing device further includes displaying recent-most contacts on the left-most side of the drawer.

In aspects, a method for performing private messaging on a computing device further includes deleting a private message once a user exits a display frame of the message.

In still another aspect, the present disclosure features a method for performing private messaging on a communication apparatus. The method includes displaying, on a display of the communication apparatus, a messaging screen of a messaging application, the messaging screen including a private messaging button, detecting selection of the private messaging button, executing a private messaging application in response to detecting selection of the private messaging button, tagging private message data as being private, and sending the private message data to another communication apparatus.

In aspects, the method includes sending to the other communication apparatus an instruction to delete the private message data from memory of the other computing device prior to displaying a private message.

In aspects, the method includes deleting the private message data once the private message data is no longer displayed on the display.

In aspects, the method includes, upon opening a drawer, displaying a list of private messaging contacts.

In aspects, the method includes displaying, on the display, most recently contacted persons from a list of private messaging contacts.

In aspects, the method includes displaying most recently contacted persons on a left-most side of the private messaging screen.

In still another aspect, the present disclosure features a system for performing private messaging, including: (1) a first computing device configured to: display a user control for launching an application drawer; receive user activation of the user control; display an application drawer including a private messaging application icon; launch a private messaging application in response to user selection of the private messaging application icon; tag an alphanumeric message as being private; and send the alphanumeric message to another computing device; (2) a second computing device configured to: receive and store private messages; send a private message to a computing device in response to receiving a proper retrieve instruction; and delete a private message in response to receiving a proper purge instruction; and (3) a third computing device configured to: display a user control for launching an application drawer; receive user activation of the user control; display an application drawer including a private messaging application icon; launch a private messaging application in response to user selection of the private messaging application icon; receive an alphanumeric message that has been tagged as being private from another computing device; display an indicator of the alphanumeric message received through the private messaging application; receive user selection of the message indicator; display the message so that its contents are unreadable by the user or invisible to the user; detect a user's selection of a portion of the unreadable or invisible contents; display, at or near the user-selected portion of the unreadable or invisible contents, alphanumeric text corresponding to the user-selected portion of the unreadable or invisible contents.

In aspects, the computing device is configured to receive user instructions to delete the alphanumeric message from the third computing device.

In aspects, the second computing device as a messaging server. In aspects, in response to receiving the proper retrieve instruction by the second computing device, the second computing device sends the alphanumeric message to the third computing device.

In still another aspect, the present disclosure features a method of performing private messaging on a computing device. The method includes: displaying a user control for launching a private messaging application; detecting user activation of the user control; launching the private messaging application in response to detecting user activation of the user control; receiving an alphanumeric message that has been tagged as being private from another computing device; displaying an indicator of the alphanumeric message received through the private messaging application; receiving user selection of the indicator of the received alphanumeric message; displaying the message so that its contents are unreadable by the user or invisible to the user; detecting a user's selection of a portion of the unreadable or invisible contents; and displaying, at or near the user-selected portion of the unreadable or invisible contents, alphanumeric text corresponding to the user-selected portion of the unreadable or invisible contents.

In aspects, a method of performing private messaging on a computing device further includes upon launching the private messaging application, displaying an indicator of a sent alphanumeric message; and upon detecting user selection of the indicator of the sent alphanumeric message, sending an instruction to another computing device to delete the sent alphanumeric message.

In aspects, a method of performing private messaging on a computing device further defines detecting user activation of the user control as detecting a user's finger swiping the user control in a predetermined direction.

In aspects, a method of performing private messaging on a computing device further defines the user control as including a tab.

In aspects, a method of performing private messaging on a computing device further includes, upon detecting user selection of the user control, switching from displaying indicators of alphanumeric messages to displaying a list of contact indicators.

In aspects, a method of performing private messaging on a computing device further includes upon detecting user selection of a contact indicator, displaying an interface allowing the user to compose an alphanumeric message to a contact corresponding to the selected contact indicator.

DESCRIPTION OF THE DRAWINGS

FIGS. 3A-3F illustrate an exemplary progression of device states as a message is displayed to a user.

FIGS. 5A-5C illustrate exemplary embodiments of private messaging applet interface states.

FIGS. 7A and 7B illustrate exemplary embodiments of private messaging applet interface states.

FIGS. 8A and 8B illustrate exemplary embodiments of private messaging applet interface states.

FIGS. 9A-9C illustrate exemplary embodiments of private messaging applet interface states.

FIGS. 10A-10C illustrate a process for executing a private messaging applet within a keyboard region of a messaging application.

Figure 1A:
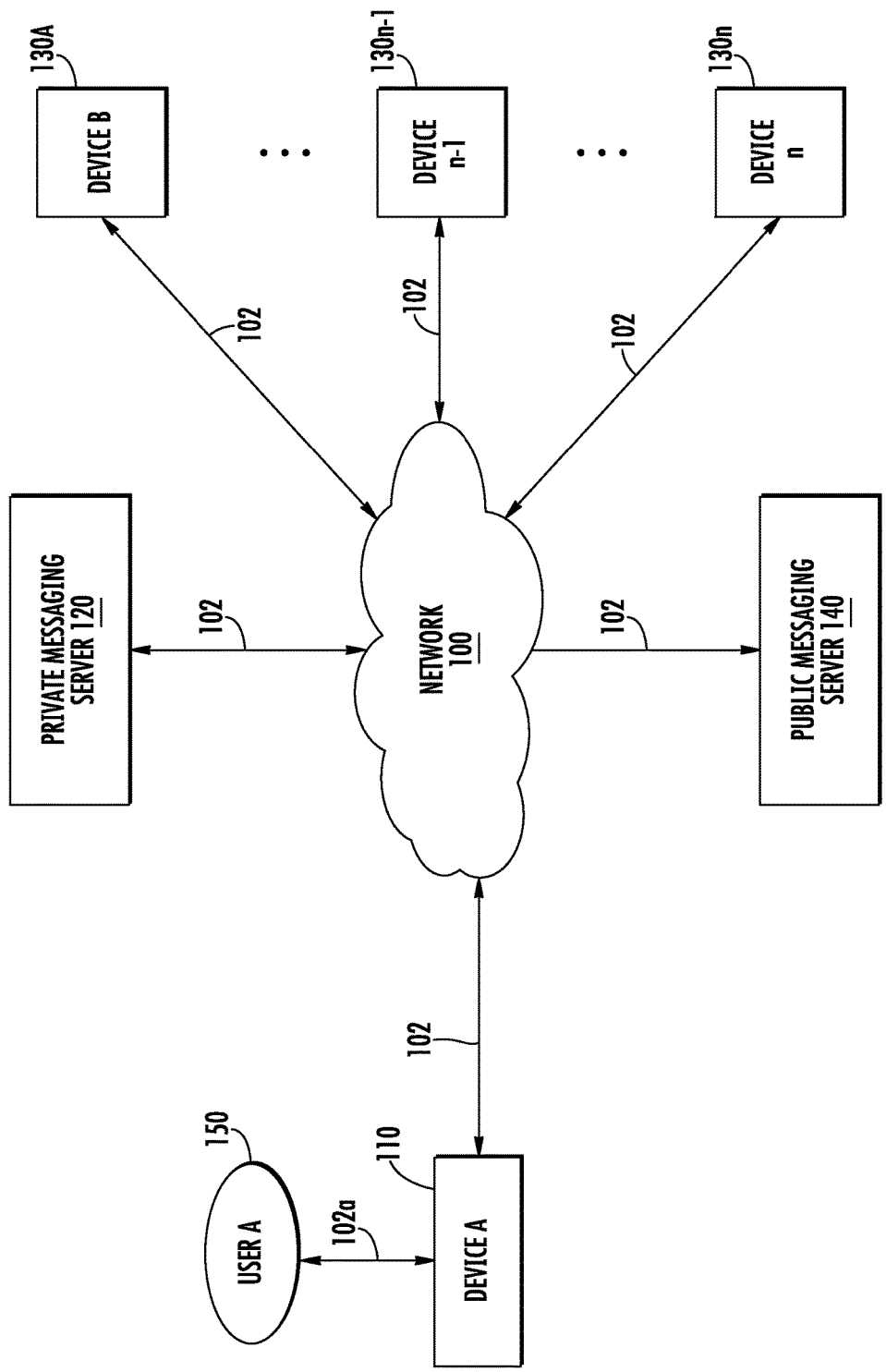
FIG. 1A is a block diagram illustrating a network configured to facilitate transmission and reception of private messages in accordance with some embodiments.

While the disclosed technology is amenable to various modifications and alternative forms, specific embodiments have been shown by way of example in the drawings and are described in detail below. The intention is not to limit the scope of the subject matter covered in the drawings; rather, it is to facilitate understanding of the embodiments described. The technology described is intended to cover all modifications, equivalents, and alternatives falling within the scope of the described technology as defined by the appended claims.

DETAILED DESCRIPTION

The present disclosure relates to systems and methods for facilitating private communications in an evolving digital age. One common example of private communication today is communication via the transmission and reception of finite sets of characters, e.g., "text messages," as well as images, audio, and video messages. The transmission of these messages allow for quick correspondence between individuals, often from mobile devices. To address concerns related to user security, and to prevent the loss of confidentiality, device and peripheral manufacturers have developed many obfuscation techniques, such as application of 3M™ privacy screen protectors.

The present disclosure features methods by which messages can be transferred in a secure fashion from a device's components to the user, allowing for greater control over content delivery. Such delivery components generally include digital displays and touch-sensitive displays. For mobile devices, particularly mobile devices with touch-sensitive displays, the methods of the present disclosure permit users to transmit message data securely in crowded areas, or areas where security can be easily compromised. As a result of introducing methods which allow for faster and more selective communications where sensitive data is being transmitted via traditional messaging systems, individuals are able to review messages they would otherwise wait to review in private.

Consider the following messaging example in which a user desires a method by which they can deliver a message privately and securely. In accordance with various embodiments, the user (i.e., sender) using a computing apparatus executes a messaging application on the device. The messaging application may be a generic messaging application which is supported by a carrier associated with the particular communication apparatus. After determining that the data to be transmitted is not generic, but rather is private, the user executes an applet, or thin application, within the messaging application for the purpose of sending a message which can be viewed in a more private or discrete manner.

In response to executing the private messaging applet, the private messaging applet displays a messaging keyboard which functions similar to the messaging keyboard of the messaging application, accepting input from the user via a keyboard or other input peripheral. However, unlike the carrier's messaging application, the private messaging applet adds an additional tag to the outgoing message and transmits the message, along with the tag, as a private message data package to a private message server.

Transmission to a private message server permits increased control over the delivery of the private message data, particularly, the ability to recall the message prior to the recipient's opening of the message. Given that the message is stored on a server until the message is transmitted to a recipient communication apparatus, the server can delete the message upon request. Or, if the message has been transmitted to the recipient device, the server can send a message to the recipient device to delete the message. This operation can occur at any point after the transmission of the initial message to the private message server up until any point prior to display of the message on the screen of the recipient device.

Should the transmitting device not send a signal to delete the private message data, the private message data is, if not already, transmitted to the recipient communication apparatus. Once the recipient inputs a request into the recipient communication apparatus to open the message for viewing, a private message screen is displayed, with the sender's message obfuscated as it is displayed.

The recipient's communication apparatus then continuously queries the touch-sensitive display to identify the location of user input, namely, where a finger is touching or in tangible communication with the device display. Upon identifying the location of the user input, and verifying that this input has been continuous and within the region in which the message is to be displayed, a smaller corresponding portion of the message is displayed in the corresponding region in the obfuscated region.

This process of querying the display for continuous location information of user input continues until the user removes his finger from the touch-sensitive display. In an alternative embodiment, the process continues until the user's finger leaves the predefined region in which the message is displayed. As a result, the full image is obfuscated, or alternatively the device removes the private message screen and displays, still within the messenger's keyboard region, the private messaging applet's keyboard. Hence, the user who transmitted the message is able to ensure that, to the extent the recipient is willing to mitigate the chances that their message will be received by an unintended individual, the likelihood of maintaining privacy during the communication is improved over conventional methods of communication currently available.

Although the following description uses terms "first," "second," etc. to describe various elements, those elements should not be limited by the use of those terms. Those terms are only used to distinguish one element from another. For example, a first private message could be termed a second private message, and, similarly, a second private message could be termed a first private message. Defining either message as either a first private message or second private message can be defined without departing from the scope of the various described embodiments. The first private message and the second private message are both private messages, though they exist as independent messages.

The terms "connected" or "in communication with" and related terms are used in an operational sense and are not to be limited to a direct physical connection. For example, two devices may be coupled together via a wireless network or via a physical connection. Based on the disclosure provided herein, a person of ordinary skill in the art will appreciate a variety of ways in which devices can be connected or in communication with one another, in accordance with the aforementioned definition.

Figure 1B:
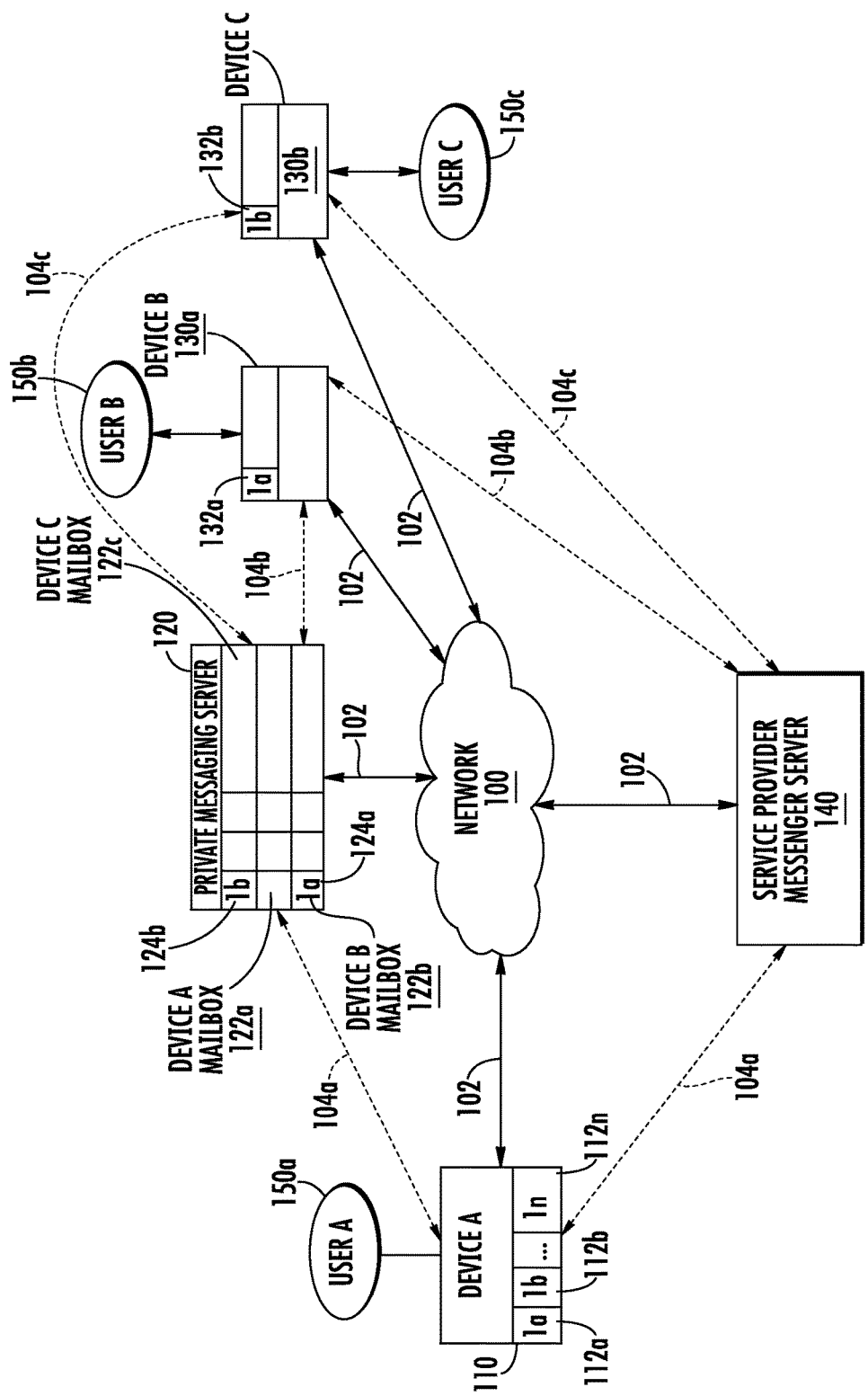
FIG. 1B is a block diagram illustrating the network of FIG. 1A transmitting messages in accordance with some embodiments.

FIGS. 1A and 1B provide a description of exemplary devices connected for performing the functions of accepting, tagging, transmitting, and selectively displaying private message data containing private messages.

Network 100 can include any combination of local area networks (LANs), wide area networks (WANs), wireless local area networks (WLANs), Metropolitan Area Network (MAN), wireless networks, secured networks such as virtual private networks (VPNs) or any other suitable system of interconnected devices in which data packets are transferred between two or more devices via connections 102. In one embodiment, network 100 uses standard communications technologies and/or protocols to establish connections 102 in order to facilitate the transfer of data packets between a plurality of independent devices. As a result, network 100 may be capable of transmitting a variety of data of a variety of data formats for increased interoperability between devices across a variety of connections 102. The use of technologies, including but not limited to, Ethernet, 802.11 (a/b/g/n/ac), 3G, 4G, CDMA, digital subscriber line (DSL), and the like, permits the communication between a variety of devices which may be configured to transmit and receive data in varying protocols. Further, implementation of certain protocols facilitates the transfer of data across network 100 such as transmission control protocol/internet protocol (TCP/IP) or hypertext transport protocol (HTTP), simple mail transfer protocol (SMTP) and file transfer protocol (FTP) allow for more uniform and efficient transfer of data between varying devices along network 100.

Public messaging server 140 can be any computing device configured to store, process and transmit message data. Such services today are traditionally being hosted by an existing internet service provider (ISP) or mobile service provider (mobile carrier), but also by third party corporations such as Google®, Apple®, Facebook®, WhatsApp®, or Snap Inc.®, which host private messaging utilities such as Google Hangouts® or iChat®. Public messaging servers 140 can accept a variety of either publically available or proprietary file formats.

Device 110 can be any computing apparatus which is capable of both accepting input, either through a touch-sensitive screen, peripheral (such as a keyboard), audio streams, video streams, or data from other sensors embedded or communication with the computing apparatus. Device 110 can be calibrated to engage with public messaging server 140 to optimize message transfer and interoperability, as well as with public messaging servers 140. Public messaging servers 140 can enhance interoperability by interacting with corresponding messaging applications or by implementing standards which are accepted by the service provider community, such as SMS or MMS messaging.

Device A 110 and Devices 130a-130n can be electronic devices which are capable of executing computing functions, examples of such devices including mobile phones, desktop computers, thin client computing devices, laptop computers, virtualized computers, cluster or cloud computing environments, application specific integrated circuits, field programmable gate arrays, or any combination thereof.

Connections 102 can include a variety of connection techniques such as interconnection of digital devices via wireless communication on the 802.11 standard (a/b/g/n/ac) (wifi), Ethernet, 3G, 4G, CDMA, digital subscriber line (DSL), and the like. Further, data transmission over a connection 102 may be accomplished with TCIP/IP, HTTP, secure hypertext transfer protocol (HTTPS), SMTP, and FTP may all be implemented in transferring data across connections 102.

User 150, 150a-150n can be any means of generating device 110, 130a-130n input, such input generally being received by a person or persons. Other means of input by a user 150 can be by simulation such as Apple®'s Siri®, or Microsoft®'s Cortana®.

Private messages 112a-112n, can be any object stored in data which is translatable, either by hardware or software implemented methods, and recognizable by a device 110.

In accordance with some embodiments, private messages 112a-112n may be transferred via a connection 102 to a private message server 120 via a network 100. The private message can include any encoding of a translatable set of data, ranging from Arabic letters (commonly referred to as characters), arrays of characters (strings), images, compressed images such as those compressed under the Joint Photographic Experts Group (JPEG) standard, video, compressed video such as Moving Picture Experts Group Phase 1 (MPEG-1 or MPEG), or other proprietary data sets.

The private message also includes a tag or other similar identifier that identifies the message as a private message. The tag and private message 112a-112n may be transferred together as a private message data packet. The private message data can then be stored on a private messaging server 120 which is configured to receive and store data from a variety of devices 110, 130a-130n. Private messaging servers 120 can be configured to store the data either as it is transmitted or in a converted manner for data storage optimization. Such private message data, once received by a private messaging server 120 can then be stored in server memory with a mailbox 122a-122n tag, the mailbox tag designating both the source and destination of the data stored on the private messaging server 120.

FIG. 1A illustrates an example of a high level network environment, the network environment depicting the connections 102 between multiple computing apparatuses, including devices 110, 130a-130n, as well as a private messaging server 120 and public messaging server 140. The described devices 110, 130a-130n, public messaging server 140 and private messaging server 120 are all interconnected via a network 100, the network facilitating data transactions between computing apparatuses along data paths 104a-104n.

FIG. 1B illustrates the transmission of a private message 112a-112n to a variety of recipients via a private messaging server 120. Device A 110 engages in a series of data transactions along data paths 104a-104n which translate, and verify the translation of, data between transmission devices based on predetermined transmission protocols such as Device A 110 and a recipient device or devices such as a private messaging server 120 and ultimately Device B 130a and Device C 130b. The initial data transaction transmits private message data, including a private message 112a-112n, as well as a tag if the message is marked private, and any intended recipient data, such as identifying address for User B 150b and/or User C 150c.

As stated, private messaging servers 120 can be configured to optimally tag, store, and ultimately transmit private message data, including private messages 112a-112n.

The embodiment depicted in FIG. 1B includes mailboxes 122a-122n stored within the memory of a private messaging server 120, which include demarcated regions in memory allocated to device 110, 130a-130n. Mailboxes 122a-122n can contain additional tags associated with the private message data stored in the mailbox 122a-122n, such additional tags including device 130a-130n address information, device 110 address information, and locks to prevent transfer of the data to a recipient.

Figure 2:
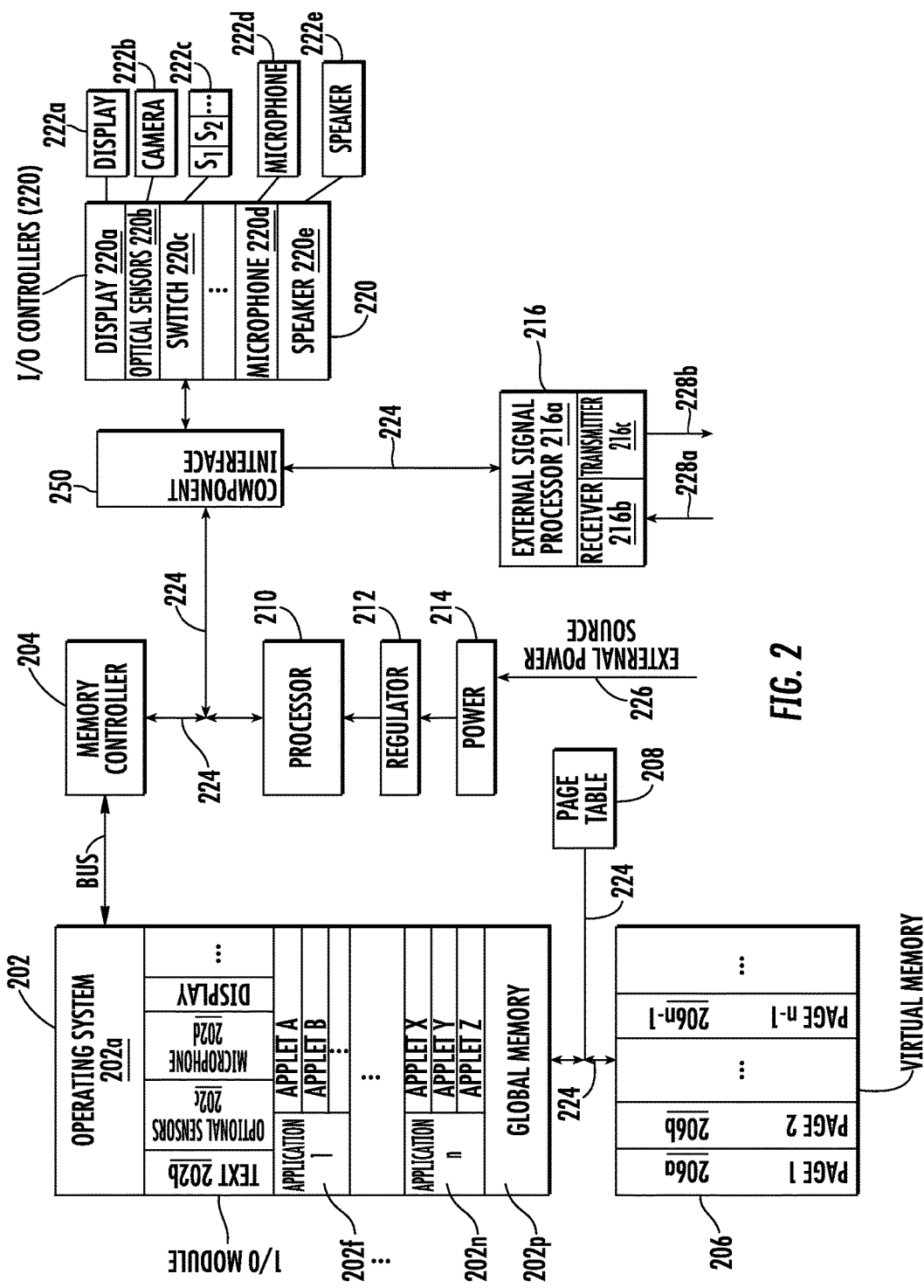
FIG. 2 is a block diagram illustrating a communication apparatus with various input and output components in accordance with some embodiments.

FIG. 2 illustrates a set of components within a device 110, 130a-130n according to one or more embodiments of the technology disclosed herein. According to the embodiment disclosed in FIG. 2, device 110, 130a-130n can include memory 202, a memory controller 204, non-volatile memory 206, page tables 208, one or more processors, including main processor 210, component interfaces 250, input/output (I/O) component controllers 220, external signal processors 216a and device components 222a-222e. Other embodiments of the disclosed technology may include some, all, or none of these elements along with additional or different modules, applications, and/or components. Likewise, some embodiments may incorporate two or more of these modules and components into singular modules or components. Alternatively, some embodiments may implement the functionality of the disclosed embodiments in different manners, such as by combining, reorganizing, or substituting components or modules. For example, Application 1 202f may not contain Applet memory within the memory space allocated to Application 1, with the memory space located alternatively in a unique region within global memory 202p space. Such memory may be allocated at runtime, or may be allocated upon Application 202f execution.

It will be recognized by one skilled in the art that the device 110 shares many of the same components and configurations with both the private messaging server 120 and public messaging server 140. One skilled in the art will also recognize that, depending on the amount of devices connecting to either the private messaging server 120 or public messaging server 140, different configurations will be desirable for increasing message handling efficiency. Such configurations may include the virtualization of such devices within hosted environments such as Microsoft®'s Azure® environment, Amazon®'s Web Services® (AWS®) or Google®'s Cloud Platform Service™.

Memory 202 can be any device, physical structure, and/or populated data structure which functions as a recorded media storage device. In some embodiments, memory 202 may be computer memory which is volatile, or rather, memory 202 which does not maintain its state once an electric current is no longer available. Memory 202, which in some embodiments is volatile, may be substituted in alternative embodiments with non-volatile memory components, dynamic memory, or redundant memory. Examples of such memory 202 include random access memory (RAM), memory storage devices, optical memory devices, medial magnetic media, floppy disks, magnetic tapes, disc hard drives, solid state hard drives, SDRAM, DDR RAM, erasable programmable read-only memories (EEPROMs), compact discs, DVDs, or other media that store data for future retrieval or modification. In accordance with some embodiments, memory 202 can be contained within one contiguous region of a physical device, may span across multiple regions on a physical device, or may span multiple memory 202 devices such as virtual memory allocated within non-volatile memory space 206.

Operating system 202a can provide a device environment which permits the continuous initialization, execution, storage, and termination of one or more applications 202f-202n. Operating systems 202a are generally stored in non-volatile memory 206 and are initialized when power 214 is applied to a device, such power being regulated by a regulator 212. The operating system 202a, once initialized, controls the generation of applications 202f-202n, and allocation of resources to applications such as an initial address space within memory 202, cycles to execute functions on the main processor 210 and access to non-volatile memory 206 such as pages 206a-206n stored in virtual memory, according to one disclosed embodiment.

Page table 208 can be any device which accurately maps the data locations stored within memory 202 and non-volatile memory 206, sometimes referred to as pages 206a-206n. In some embodiments, page tables accurately store and retrieve data, swapping information between memory and non-volatile memory 202, 206 regions between device components. Page tables 208 facilitate the transfer of pages 206a-206n, which in turn allow for the storage of application-specific data for use after the application has terminated or has been forced from memory 202.

Non-volatile memory as stated earlier, can be any type of memory which permits extended temporal storage of media. In some embodiments, non-volatile memory can be a solid state hard drive (SSD), disk drive, tape drive, compact disc, or virtual memory which is either stored local, or remote from the device. One skilled in the art will appreciate additional devices, storage techniques, and device configurations which can simulate or act as functional equivalents to existing disclosed device memory configurations.

Device applications, and in particular public and private messaging applications, can be stored in memory 202 and retrieved for later execution on a device 110, 130a-130n. In certain embodiments, main processor 210 can execute various applications and sub-applications or "applets" which include instruction sets stored in memory 202. In some embodiments, processors may be included in certain device components such as I/O components. For example, one skilled in the art will appreciate that a device display 220a may contain within the component's hardware a processor for executing certain graphical functions separate from the application's execution on the device's 110 main processor 210.

A component controller 220 can be any device module or component which handles the transmission of I/O data collected from device components 222a-222e, such as cameras 222b, device displays 222a, device buttons 222c, microphones 222d, and speakers 222e. Device displays 222a can be either traditional displays or touch-sensitive displays. In some embodiments, where a touch-sensitive display 222a is implemented, the component controller 220 controls both the output of display information to either a display processor or directly to the display 222a, as well as the input from the touch sensitive display 222a simultaneously, and transmits the input data in relation to the output data to a display module 202e for use by applications executed by the main processor 210.

Component interface 250 can be any signal processor which implements a routing system between a variety of sub-components and controllers. In some embodiments, a component interface 250 routes signals accepted from both a component controller 220 and a transceiver 216, the transceiver 216 handling the transmission and receipt of externals with an external signal processor 216a.

FIGS. 3A-3F illustrates a graphical progression of a series of applications and functions executed on device 110, 130a-130n.

FIG. 3A depicts a messaging application, which contains a messaging space 302, messaging application keyboard region 304, message input field 320, and private messaging button 306. The private messaging button 306 in certain embodiments may contain notification data which corresponds to any messages which have not been either recognized or read by a user 150, 150a-150n. The messaging application depicted in FIG. 3A in certain embodiments is configured to transmit messages to a public messaging server 140 through one or more connections 102, the transmitted messages containing public message data, and address data for delivery to a recipient or recipient device or devices 130a-130n.

FIG. 3B depicts a device which has executed a private messaging applet within a public messaging application. The private messaging applet is displayed in a private messaging applet region 314 on the display 222a. In certain embodiments, the private messaging applet region 314 is contained within the messaging application keyboard region 304 of the public messaging application. The private messaging applet region 314 includes a private message input field 308 private message send button 310 as well as a traditional QWERTY keyboard for inputting character information into the private message input field 308.

FIG. 3C depicts a device which executes a private messaging applet within a public messaging application. In certain embodiments, the private messaging applet further includes a private message jump bar 316 in place of a private message input field 308 and private message send button 310. The private message jump bar can include one or more private message icons 318, the private message icons indicating whether a private message, stack of private messages, or array of private messages are available on the device 110 for review.

Figure 3F:
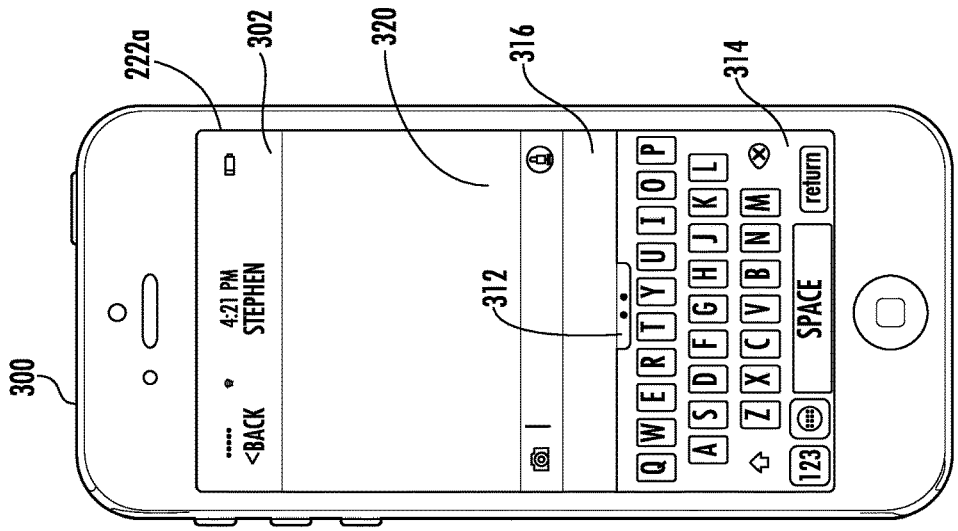
Figure 3E:
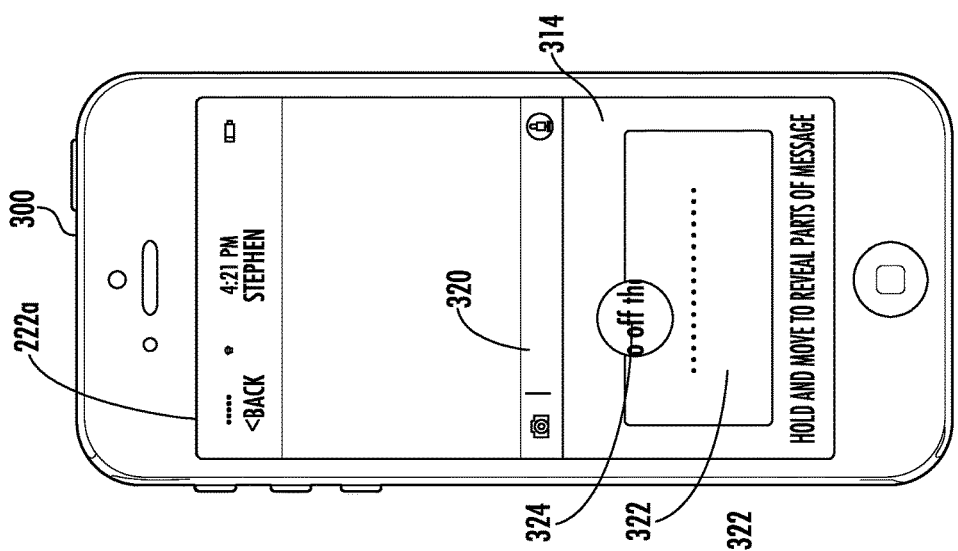
Figure 3D:
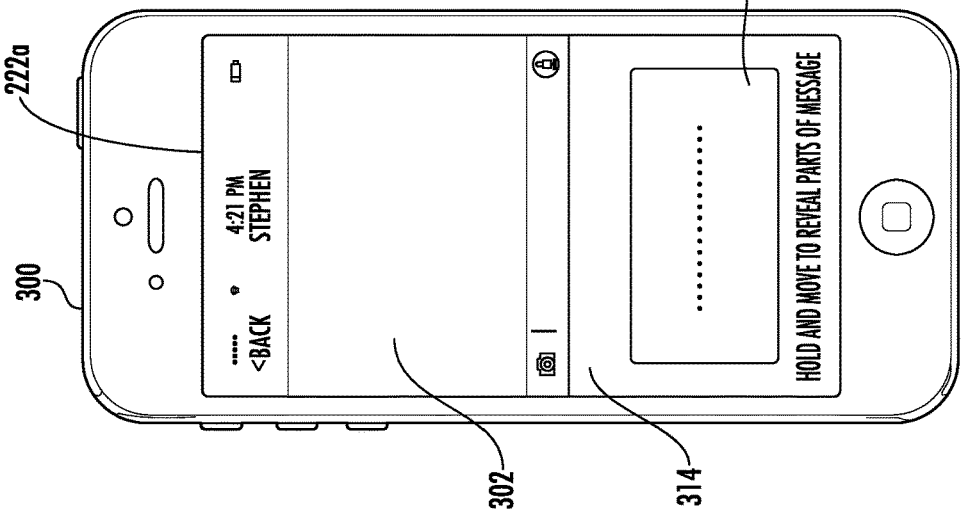

FIG. 3D depicts a device which, upon display of a set of private message icons 318, executes the display function on one of the private message icons 318, and displays an obfuscated message on a display 222a. In certain embodiments, the private messaging applet region contains a private message region 322 which displays an obfuscated version of the private message. In some embodiments, the obfuscated version of the private message correlates to an unobfuscated version of the private message which is partially displayed once the user selects a portion of the obfuscated version of the private message. In other embodiments, the private message may be obfuscated by applying an obfuscating or blurring filter to the private message. Then, when a user selects a portion of or a region within the obfuscated private message, the private messaging applet removes the obfuscating filter from only that portion or region of the private message selected by the user.

FIG. 3E depicts an embodiment of the device as displayed in FIG. 3C. In the displayed embodiment, the obfuscated private message content is displayed within the private message region 322, the private message bounded by the private messaging applet region 314. A portion of the private message is selected by the user 150a-150n and a corresponding portion of the private message is displayed unobfuscated in accordance with the location selected.

FIG. 3F shows the resulting state of a device 110 once a private message has been read, and the private messaging applet is no longer receiving input from a device component 220a-220e.

FIGS. 4A-4F illustrate a graphical progression of a series of applications and functions executed on device 110.

Figure 4C:
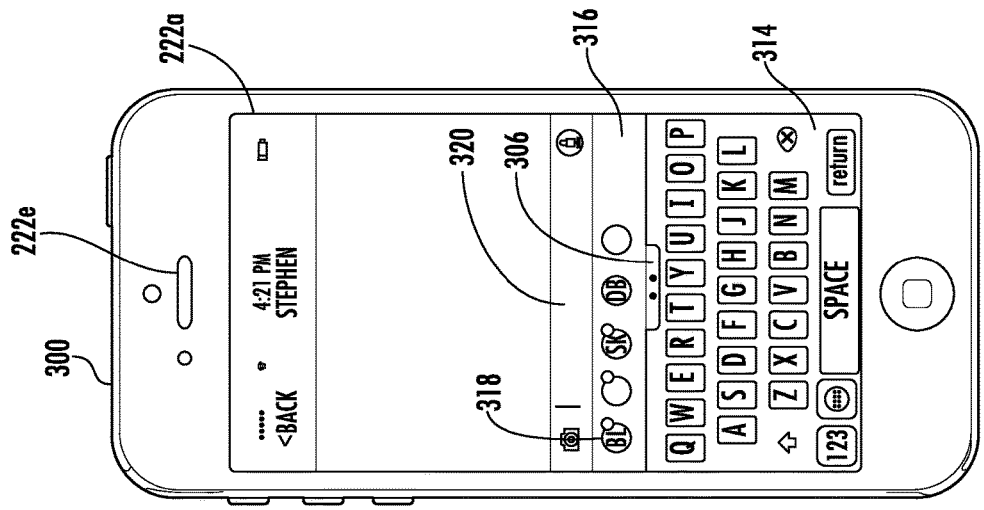
FIGS. 4A-4F illustrate an exemplary progression of device states as a message is composed and transmitted by a user.
Figure 4B:
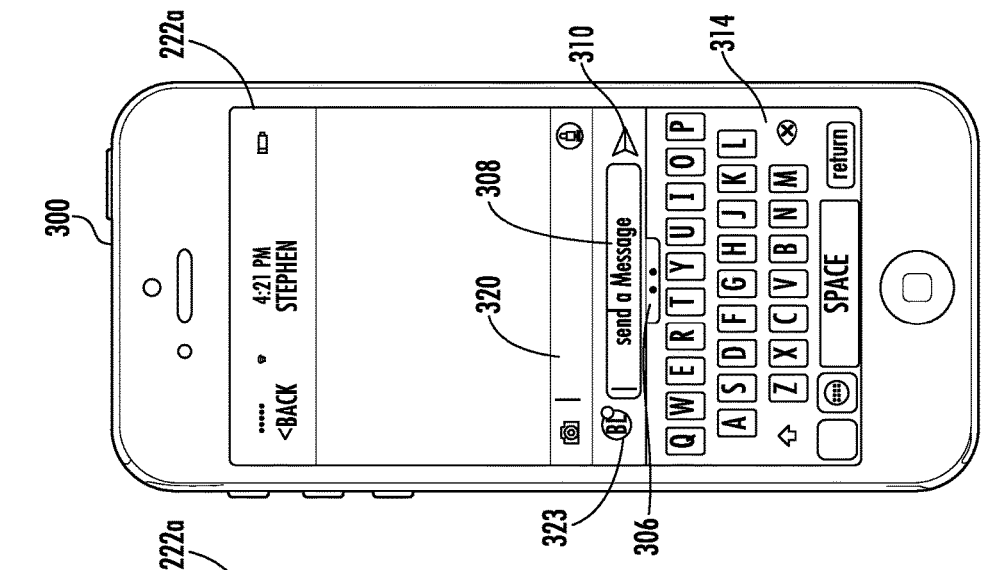
Figure 4A:
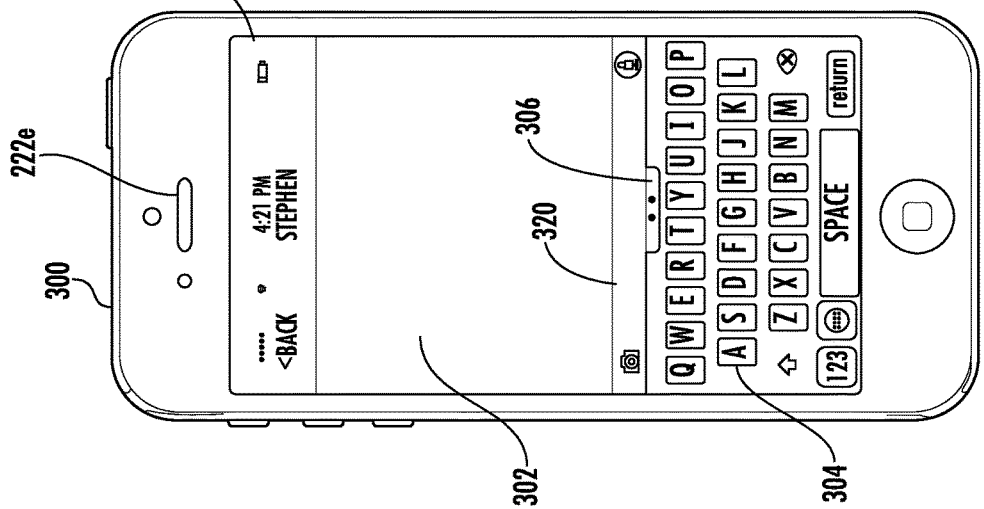

FIG. 4A depicts device 110 as depicted in FIG. 3A. However, in the current embodiment, the device of FIG. 4A depicts a device state in which no messages have been received and have not been acknowledged or read by a user 150a-150n.

FIG. 4B depicts a device which has executed a private messaging applet within a public messaging application, the private messaging application being displayed in a private messaging applet region 314 on the display 222a. In the displayed embodiment, the private messaging applet further displays a private message recipient button 323, the private message recipient button indicating that the private message input in the private message input field 308 will be transmitted to two or more recipients.

FIG. 4C depicts a device which has executed a private messaging applet within a public messaging application. In the depicted embodiment, the private messaging applet further contains a private message jump bar, which displays a series of private message icons 318. Within the series of private message icons 318 are both private message icons 318, which notify the user 150a-150n that at least one private message is awaiting review, as well as private message icons 318, which notify the user 150a-150n that multiple messages are awaiting review.

Figure 4F:
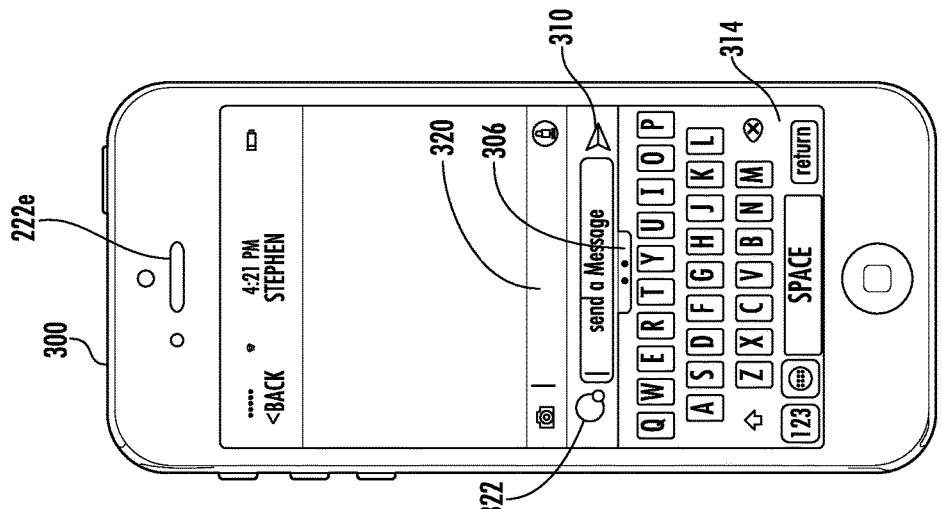
Figure 4E:
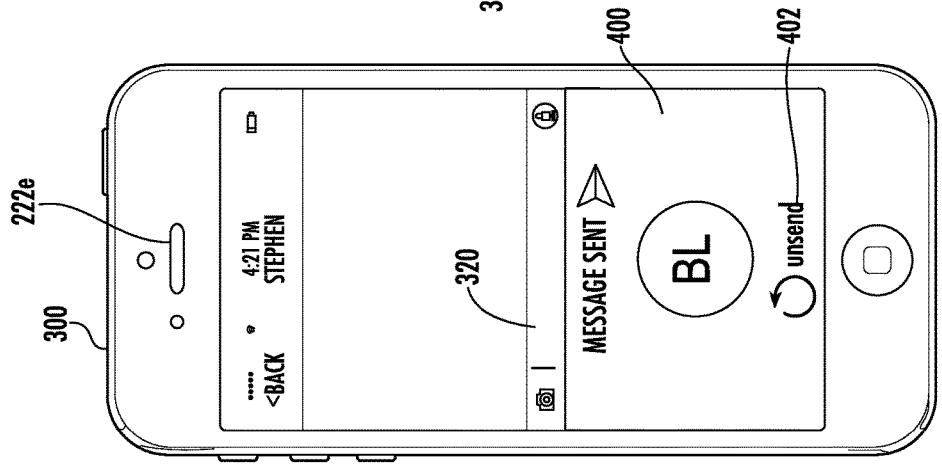
Figure 4D:
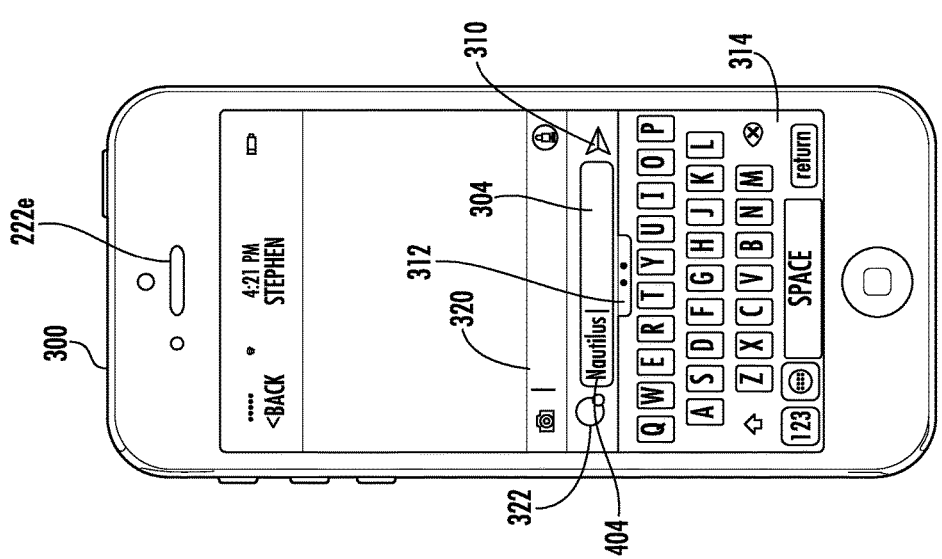

FIG. 4D depicts an embodiment in which a device has executed a private messaging applet within a public messaging application. In the depicted embodiment, the private messaging applet has received a private message, which contains the series of characters "Nautilus," which is under review pending transmission to a private messaging server 120 and ultimately a recipient device 130a-130n. Transmission of the private message can be accomplished by selecting the private message send button 310, which upon actuation causes the device 110 to transmit the private message and any relevant additional elements to a private messaging server 120.

FIG. 4E depicts an embodiment in which a device has transmitted a private message from a private messaging applet, the private message transmission causing the device to display a transmission confirmation screen 400 of the private message. The transmission confirmation screen 400 is bounded by the private messaging applet region 314 and includes a message recall button 402. Upon actuation, the message recall button 402 notifies the private message server 120 which marks for deletion and deletes the private message, as well as notifies recipient devices which have received the private message data but have not yet displayed the private message to delete the private message data.

FIG. 4F depicts the embodiment discussed in FIG. 4E after executing an instruction to return to the main private messaging screen as depicted in FIG. 4B.

FIG. 5A-5C illustrates a progression of the private messaging applet within the private messaging applet region 314 of the display.

FIG. 5A depicts an exemplary embodiment of the private messaging applet displayed within the private messaging applet region 314 of the display. The private messaging applet displayed contains within it a private message input region 404, a private messaging applet region 314, a private message jump bar button 312, and private message send button 310. The private message jump bar button 312 is configured to execute instructions upon selection to swap out the private message input field 308 with the private message jump bar 316, and vice versa.

FIG. 5B depicts the display of FIG. 5A once the private message jump bar button 312 has been selected. As a result of the private message jump bar button 312 actuation, the private message applet region 314 of the display includes a private message jump bar 316 in lieu of a private message input field 308 and private message send button 310. Actuation of the private message jump bar button 312 returns the private message applet region 314 to its initial state depicted in FIG. 5A.

FIG. 5C depicts the display of FIG. 5B after the private message jump bar button 312 has been selected a second time. The device 110 displays the private messaging applet region in an initial start state as depicted in FIG. 5A, however, the private message input field 308 no longer containing a text input within the private message input region 404.

Figure 6B:
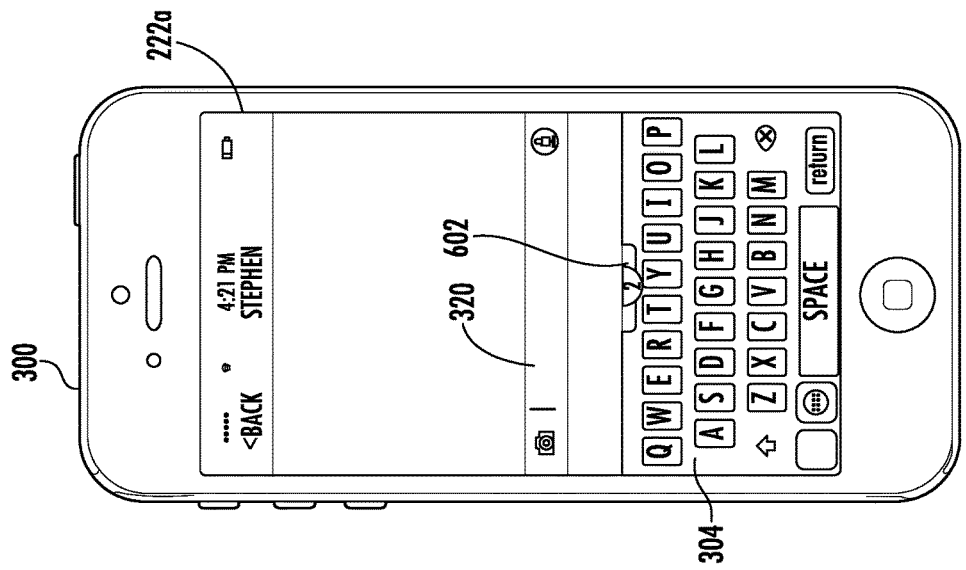
FIGS. 6A and 6B illustrate exemplary embodiments of messaging application interface states.
Figure 6A:
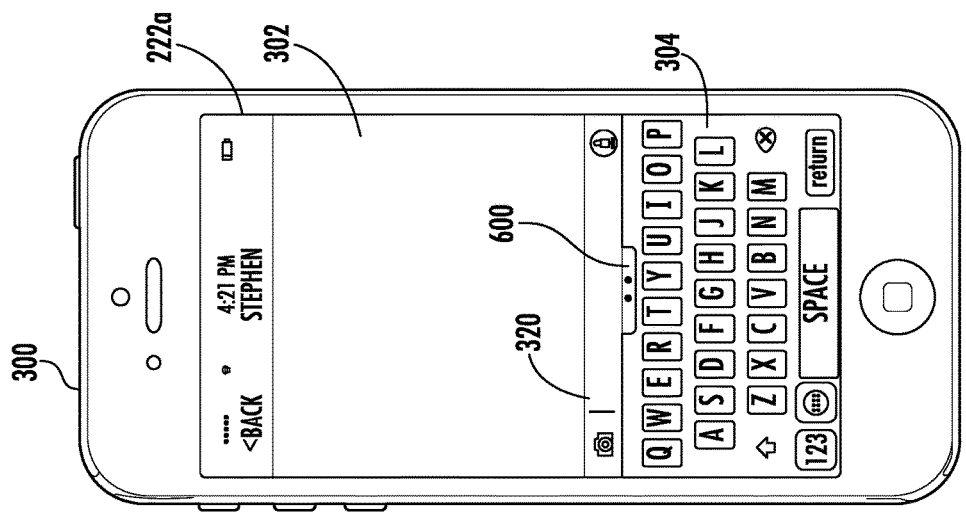

FIG. 6A is an example of a messaging application in a default state, the messaging application including a messaging application keyboard region 304, a message input field 320, and a private messaging applet button 300. The private messaging applet button 300 as embodied in FIG. 6A is displayed as a pull down bar 600 which in one state does not relay any notification information.

FIG. 6B is an example of a messaging application in a second state, the messaging application including a messaging application keyboard region 304, a message input field 320, and a private messaging applet button 300. The private messaging applet button 300 as embodied in FIG. 6B is displayed as a pull down bar 600 which in one state relays notification information. The pull down bar 600 as embodied in FIG. 6B displays on the display 222a that two messages are currently awaiting review.

FIG. 7A is an example of a user interface which includes a private message applet button 300 which is displayed in the form of a pull down bar 700. As embodied in FIG. 7A, the pull down bar 700 contains an indicator as to which state the private messaging applet is in. The private message input field 308 is included in the private messaging applet region 314 of the display 222a.

FIG. 7B is the interface of FIG. 7A, with the pull down bar 702 displaying information relating to the second state of the device 110. In the second state, a private message jump bar 316 is displayed along with a series of private message icons 318 in place of the private message input field 308.

FIG. 8A is an example of an interface which includes a private message jump bar button 312. The private message jump bar button 312 is attached to a private message applet region 314 which includes recently messaged contact icons 800 and a list of existing contacts. The list includes inviteable contacts 804 which can be sent an invitation to install the private messaging application upon selection of the inviteable contact 804.

FIG. 8B is an example of an interface which includes a private message recipient indicator 802 which indicates that the input message is to be sent to two devices 110. FIG. 9A is an example of an interface which contains, within the private messaging applet region 314, a private messaging inbox 902, which populates a list of existing messages stored either on the devices 110 or on the private messaging server 120.

FIG. 9B is an example of an interface which contains, within the private messaging applet region 314, a private messaging outbox 900, the private message outbox having a list containing outgoing messages 908, with each outgoing message having a recall button 906 which, when selected, sends a recall notice to the private message server 120, which, in turn, marks and deletes the private message as well as transmits a signal to the recipient device or devices 110 to delete the message if it is still in the private messaging applet's inbox.

FIG. 9C is an example of an interface displaying a screen after a sent message has been selected for recall. The sent message screen 910 includes a cancel button 912, which, when selected, disregards the user's initial request to recall the sent message. The sent message screen 910 also includes a recall button 914, which, when selected, sends a signal to the private messaging server 120 to recall the message. In turn, the private messaging server 120 sends a message to recipient devices 110 to delete the message. In embodiments, the private messaging server 120 sends a message to recipient devices 110 to delete the message if the message is not already displayed on the recipient devices 110.

FIGS. 10A-10C is an example interface illustrating an embodiment in which selection of the private messaging button 306 by a user causes the private messaging applet region 314 to appear. In embodiments, a user 150, 150a-150c selects or presses the private messaging button 306 by selecting the location of the private messaging button 306 on the touch-sensitive display 222a, and, while maintaining contact with the initial location on the touch-sensitive display 222a, translating or swiping the input, e.g., a finger or pointing device such as a stylus, in a downward direction toward the bottom of the messaging application keyboard region 304 to reveal the private messaging applet region 314. Once this translation or swipe has revealed the private messaging applet region 314, a private message jump bar button 312 is displayed, which permits a user 150, 150a-150n to switch between private messaging applet states as described in the embodiment of FIGS. 7A and 7B.

Figure 11:
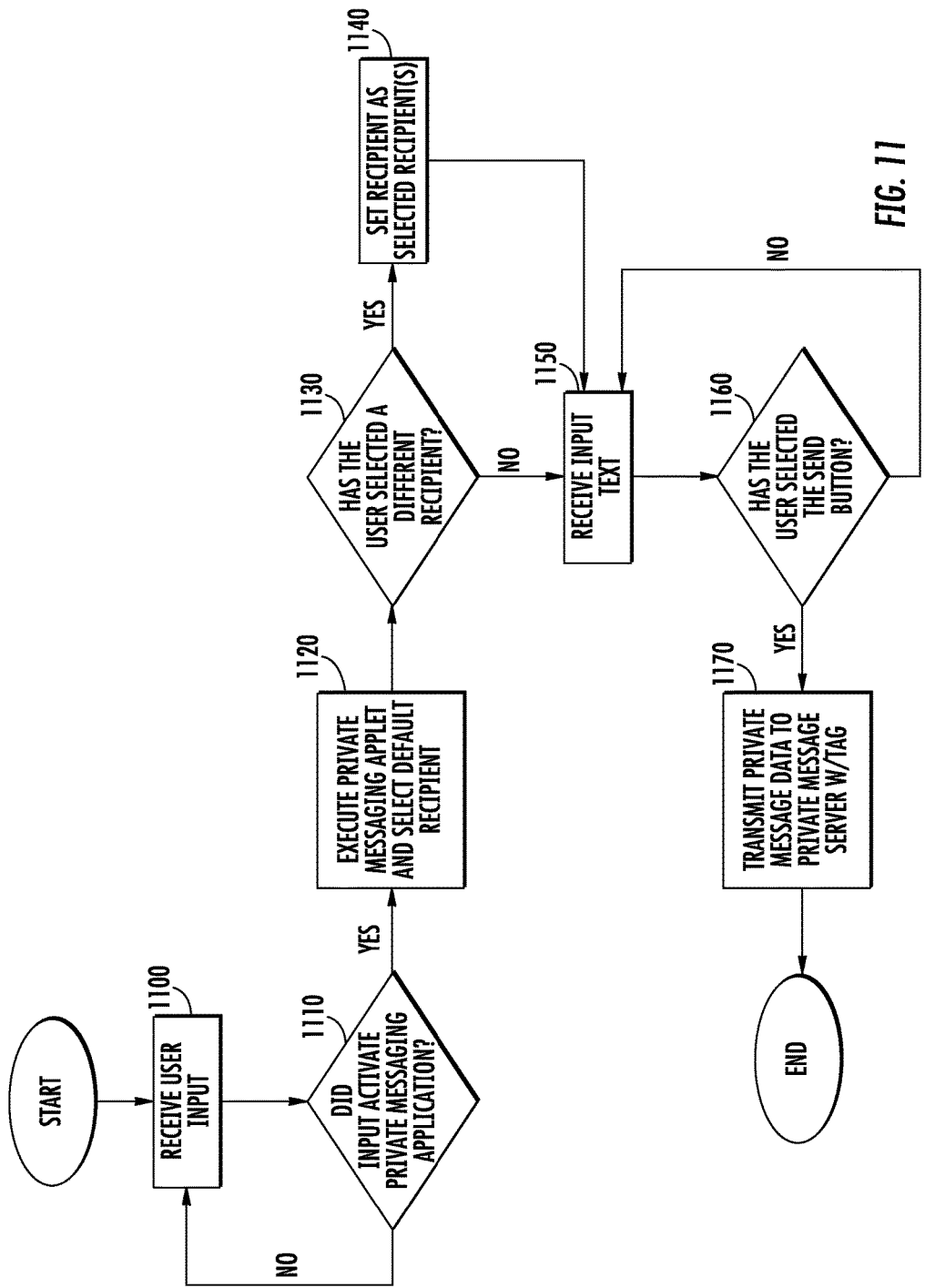
FIG. 11 is a flow diagram illustrating a process for sending private message data.

FIG. 11 is a flow diagram illustrating initial actuation of the private messaging applet, and transmission of a private message. In one embodiment, the device 110 receives user input at block 1100 from a touch-sensitive display. The device 110 then determines whether the input at block 1100 was within a predetermined region on the display 222a. If it is determined that the user 150, 150a-150n input was within the predefined region on the touch-sensitive display corresponding to the private messaging button 306, the messaging application causes the private messaging application to be executed at block 1120 on the device 110.

Upon execution, the private messaging applet displays a default display, which is contained within the private messaging applet region 314 of the keyboard. Simultaneously, the private messaging applet prepares a private message data packet to be sent to a recipient, which initially is the predefined default recipient at block 1120.

After initializing the initial private message data with the predefined default recipient at block 1120 the private messaging applet then determines whether a different recipient has been selected at block 1130, other than the default recipient, and if a different recipient has been selected, sets the recipient of the private message data to the address of the selected recipient at block 1140.

After determining the proper recipient, the private messaging applet receives input text at block 1150 from the display 222a. While the applet is receiving input text at block 1150, the state of the display is reevaluated at block 1160 to determine whether the next user input is selection of the private message send button 310. Upon detecting a user input which is determined to be a selection of the private message send button 310 at block 1160, the private messaging applet causes the private message data to be transmitted to the private message server 120. The private message data may include a tag indicating that the private message is private and address data identifying the recipient.

Figure 12:
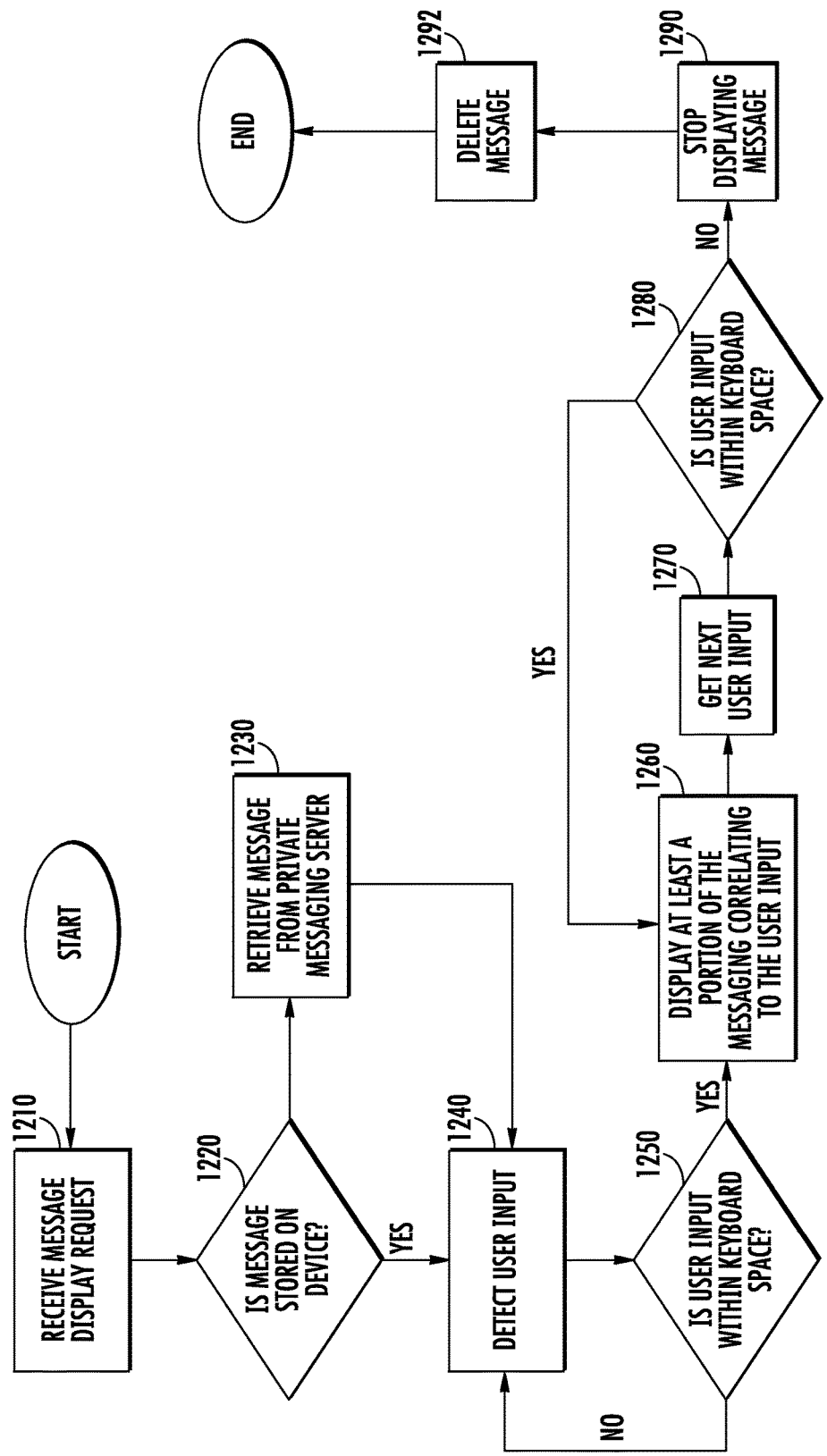
FIG. 12 is a flow diagram illustrating a process for receiving and displaying private message data.

FIG. 12 is a flow diagram illustrating a process associated with displaying a message in the private messaging applet region 314 on the display 222a. In one embodiment, a device 110 receives a request to display a private message at block 1210 from a user 150, 150a-150n. The device 110 is then checked by the private messaging applet to determine whether the private message selected for display at block 1210 is stored locally on the device 110, either in memory 202 or in non-volatile memory 206. If the private message is determined not to be stored on the device 110, the applet causes the device 110 to retrieve the message at block 1230 from the private messaging server 120, and store the private message in memory 202 prior to being displayed.

Once the private message is stored on the device, the private messaging applet detects user 150, 150a-150n input on the touch-sensitive display 220a continuously at block 1240 until user input is determined to be within the private messaging applet region 314 of the touch-sensitive display at block 1250. After the user input is determined to be within the private messaging applet region 314 of the display, e.g., after a user's finger makes contact with the private messaging applet region 314 of the display, the private messaging applet causes the display 222a to display an obfuscated private message within the private messaging applet region 314. For example, each of the characters of text in a private message may be shown as a dot or another character different from each of the characters of text in the private message. As another example, text and/or images in the private message may be blurred or distorted so as to be illegible or unreadable.

The private messaging applet also causes a portion of the private message to be displayed without being obfuscated at or near the location at which the user input was detected at block 1260. The private messaging applet then retrieves the next user input at block 1270, e.g., the user's finger, while continuing to make contact with the touch-sensitive display, moves to another location on the touch-sensitive display. If the next user input at block 1270 is determined to be located within the private messaging applet region at block 1280, a portion of the private message at a location at or near the location at which the user input was detected at block 1260 is displayed without be obfuscated.

When the private messaging applet determines that the user input is no longer located within the private messaging applet region 314 of the display at block 1280, e.g., when the user's finger or a pointing device no longer makes contact with the private messaging applet region 314 of the display, the private messaging applet causes the device 110 to stop displaying the private message at block 1290 within the private messaging applet region 314 of the display 222a. In embodiments, the private messaging applet causes the device 110 to stop displaying the private message after a predetermined period, e.g., 500 ms or 1 sec, has elapsed. The private messaging applet then causes the device 110 to delete the private message data from memory at block 1292.

Figure 13:
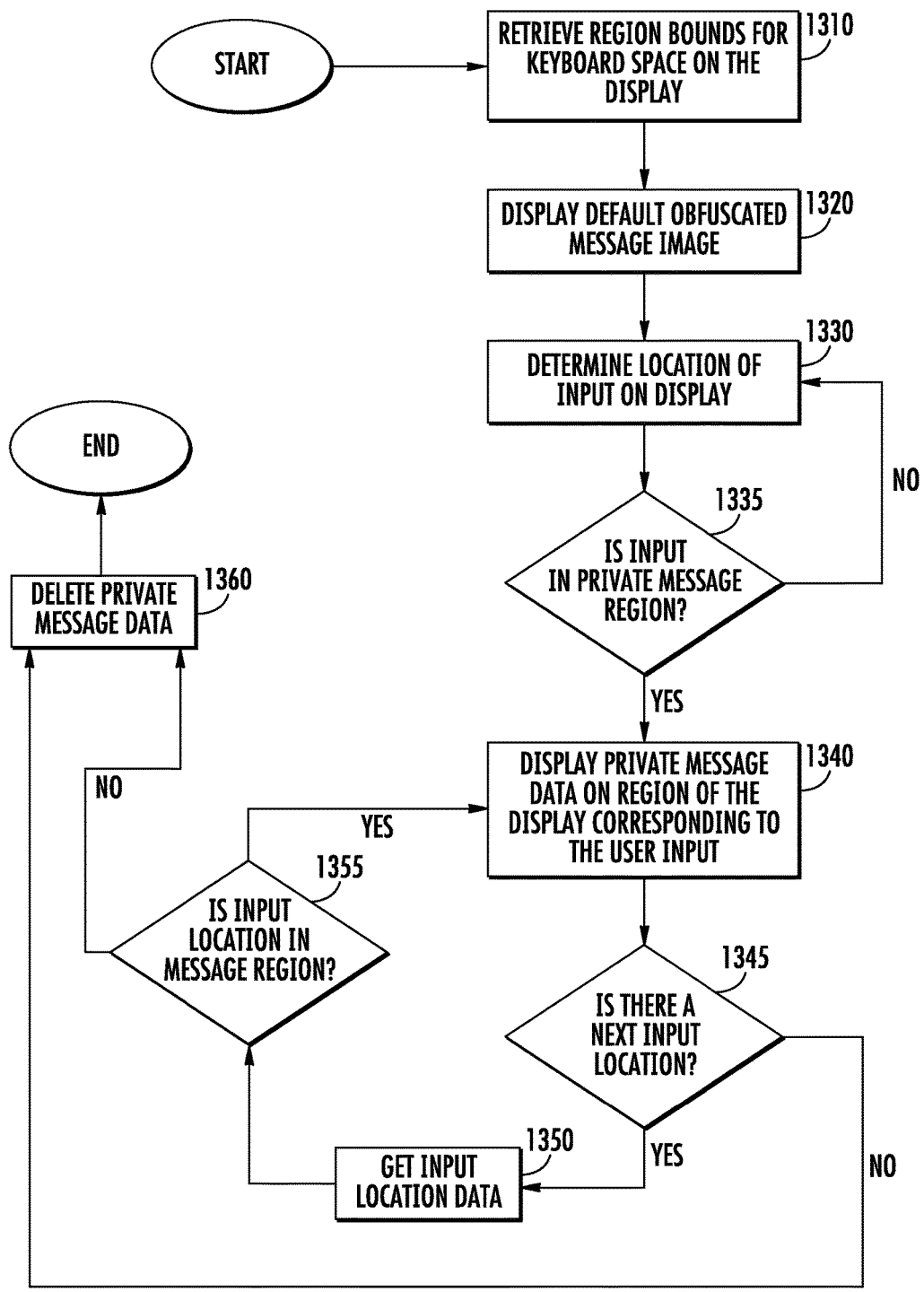
FIG. 13 is a flow diagram illustrating a process for selectively displaying received private message data.

FIG. 13 is a flow diagram illustrating a process of displaying a portion of the private message corresponding to the user input. In one embodiment, a device, e.g., one of devices 110, retrieves the determined region bounds for a private message applet region 314 on a touch-sensitive display 222a at block 1310. Once the region bounds are determined at block 1310, the private messaging applet displays an obfuscated image, e.g., a default obfuscated image indicated by settings for the private messaging applet, at block 1320 within the private messaging applet region 314 of the display 222a. While displaying the obfuscated image at block 1320, the private messaging applet determines the location of user input, e.g., a user's finger or a pointing device, on the touch-sensitive display at block 1330 and, based on the location, determines whether the user input is located within the private message applet region 314 of the display at block 1335. If the user input is not located within the private message applet region 314 of the display, the private message applet determines the location of the next input at block 1330 and whether the user input is located within the private messaging applet region 314 of the display at block 1335 until the user input is determined to be within the private messaging applet region 314 of the display.

After the determination is made that user input is located within the private messaging applet region 314 of the display, the private messaging applet displays only that portion of the private message data within a sub-region of the private messaging applet region 314 of the display corresponding to the user's input at block 1340.

The private messaging applet then determines if a next input location has been detected at block 1345 and, if so, the private messaging applet retrieves the input location data at block 1350. The private messaging applet also determines whether the input location is still within the private message region 322 of the display, and, if so, displays only that portion of the private message data that correlates or corresponds to the location on the display where the input was determined to be located at block 1340. If there is no next input location detected, for example, for a predetermined period, the private messaging applet causes the device to delete the private message data at block 1360. Likewise, if the next input location is determined not to be in the private message applet region 314 of the display, the private message data is deleted at block 1360.

Figure 14:
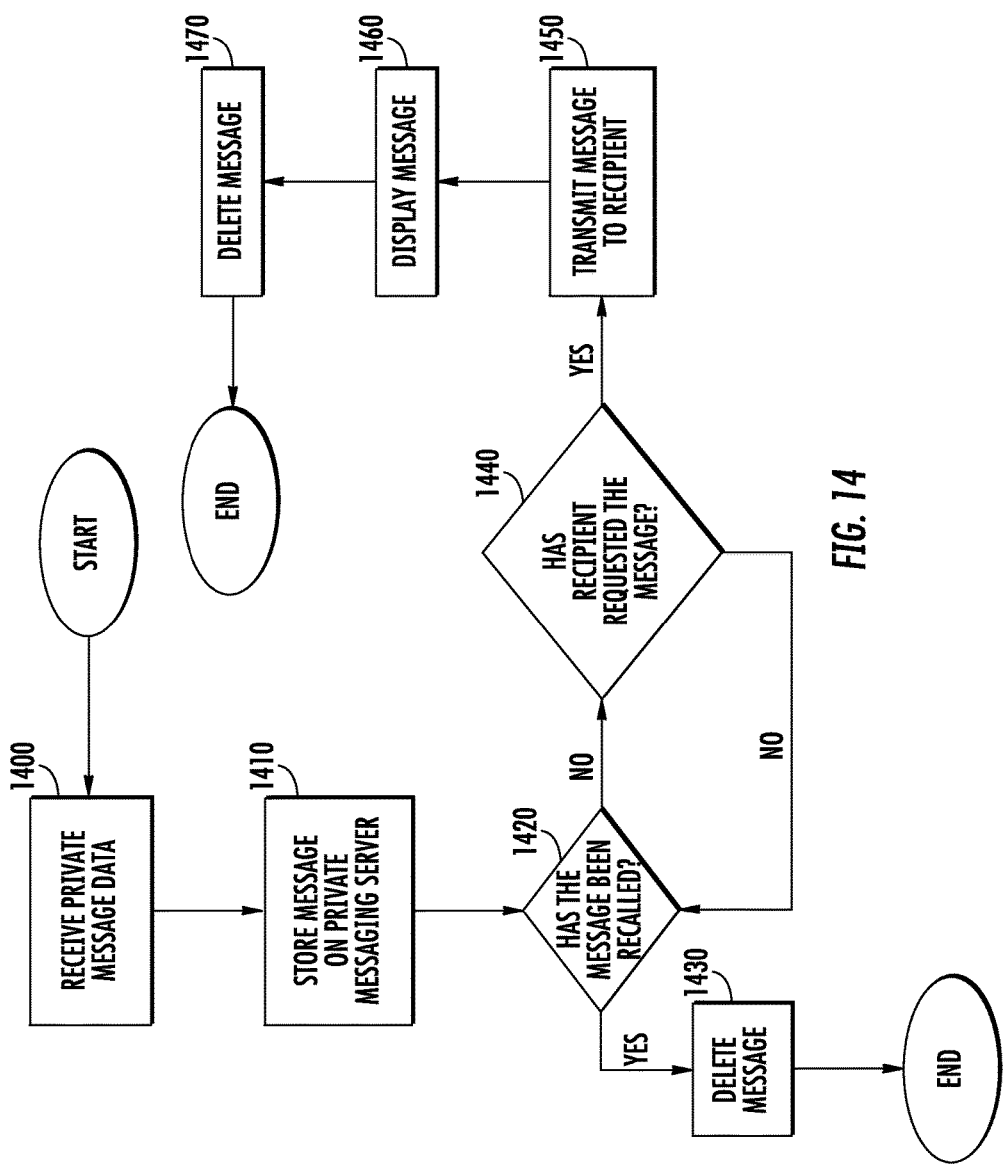
FIG. 14 is a flow diagram illustrating transmission and selective recall of private message data.

FIG. 14 is a flow diagram illustrating the process of recalling a message, and, if no recall is requested, transmitting the message, upon user request, to device 110 to be displayed. In some embodiments, device 110 receives private message data at block 1400 and stores the private message data at block 1410 on a private messaging server 120. After storing the private message data at block 1410, the private messaging server 120 determines whether the message has been recalled by the device 110 at block 1420.

If the device 110 has sent a request to the private messaging server to recall the private message data, the private message server deletes the private message data at block 1430.

If the private messaging server 120 does not receive a request to recall the private message data, the private messaging server 120 determines whether the recipient or recipients have requested the message at block 1440. Where the recipient or recipients have not requested the message, the private message server returns to the earlier recall check state at block 1420 and determines whether the message has been recalled.

Where it is determined that a recipient has requested the message at block 1440, the private message server 120 transmits the private message data to the intended recipient or recipients at block 1450. After transmission, the private message data is displayed at block 1460 on the recipient device 110, after which the private message data is deleted from the device at block 1470.

In some embodiments, the user 150, 150a-150n can input text-based messages, which is shown in FIG. 4D. Other types of data to be transferred based on this private messaging technique will be apparent to those of ordinary skill in the art. Likewise, storage of other non-text based media within a private messaging server 120 and transmission of such media to recipient devices 130a-130n will also be apparent to those of ordinary skill in the art who practice this invention.

The disclosed technology provides novel systems, methods, and arrangements for the transmission of message data between devices and secure display of the message to a user in a space where privacy is limited. Though detailed descriptions of one or more embodiments of the disclosed technology have been detailed above, various alternatives, modifications, and equivalents will be apparent to those of ordinary skill in the art without varying or departing from the spirit of the invention. For example, while the embodiments described above refer to particular features, components, or combinations thereof, such features, components, and combinations may be substituted with functionally equivalent substitutes which may or may not contain the elements as originally described or arranged.

What is claimed is:

1. A method for transmitting a private message via a display of a communication apparatus, the method comprising:
   displaying, on a display of a communication apparatus, a messaging screen of a messaging application having a message portion and a keyboard portion, the messaging screen further including a private messaging button which, when selected, executes a private messaging application;
   receiving private message data at the communication apparatus, the private message data input into a private messaging field of a second communication apparatus, and in response to receiving the private message data, displaying an indicator on the display of the communication apparatus that the private message data has been received;
   detecting selection of the private messaging button;
   executing a private messaging application in response to detecting selection of the private messaging button, the private messaging application including a private messaging field and a private messaging screen which, when the private messaging application is executed, replaces the keyboard portion of the messaging screen;
   displaying, within the keyboard portion of the messaging screen, a private message contained in the private message data so that the displayed private message is obfuscated;
   continuously detecting display input, the display input including a display location; and
   displaying, at or near the display location, a portion of the private message corresponding to the display location, the portion of the private message being unobfuscated, wherein the portion of the private message displayed is determined based on a position of the display input relative to the display of the communication apparatus.

2. The method of claim 1, further comprising receiving from the second communication apparatus an instruction to delete the private message data from memory of the communication apparatus prior to displaying the private message.

3. The method of claim 1, further comprising upon selecting the private messaging button, displaying, on the display, a list of private messaging contacts.

4. The method of claim 3, further comprising displaying, on the display, most recently contacted persons from the private messaging contacts.

5. The method of claim 4, further comprising displaying, on a left-most side of the private messaging application, the most recently contacted persons.

6. The method of claim 1, further comprising:
   executing another application based on input received from the messaging screen; and
   displaying, on at least a portion of the display, another application screen.

7. The method of claim 1, wherein the indicator is a numeric indicator showing a number of received private message data and wherein the numeric indicator is displayed over or near the private messaging button.

8. The method of claim 1, wherein the indicator represents a private message in a list of private messages.

9. The method of claim 1, further comprising permanently deleting a private message once a user exits the private message screen.

10. A system for transferring and displaying private messaging data, comprising:
    a first computing device configured to:
       display, on a display connected to the device, a messaging screen having a message portion and a keyboard portion, the messaging screen containing a private messaging icon which, when selected, executes a private messaging application;
       receive user input on the display and determine whether a first condition is met;
       display a private messaging screen within the keyboard portion of the messaging screen in response to the user input once the first condition is met;
       receive private message data from users on the device display, the private message data containing a tag indicating the private message data is private; and
       transmit the private message data to a second computing device;
    a second computing device configured to:
       receive and store private message data from at least one computing device;
       send private message data to a computing device in response to receiving a valid retrieve instruction; and
       delete private message data in response to receiving a valid purge instruction; and
    a third computing device configured to:

display, on a second display connected to a second device, a messaging screen, the messaging screen containing having the message portion and the keyboard portion, the messaging screen containing the private messaging icon which, when selected, executes the private messaging application;

receive a first user input on the second display and determine whether a second condition is met;

display a private messaging screen in response to the first user input once the second condition is met;

receive private message data that has been tagged as private from another computing device;

display an indicator of the private message data received on either of the private message icon or the private message screen;

receive a second user input on the second display and determine whether a third condition is met, the receiving causing the third computing device execute the private messaging application which replaces the keyboard portion of the messaging screen;

display the private message data on the display in a manner which obfuscates the private message data;

continuously detect a third user input, the third input including a location on the display; and display, at or near the location on the display, a portion of the private message data unobfuscated while the third input is detected, wherein the portion of the private message data which is unobfuscated is determined based on a position of the third user input relative to the second display.

11. The system of claim 10, wherein the second computing device is configured to receive device requests to delete private message data from the third computing device.

12. The system of claim 10, wherein the second computing device is a messaging server connected to the first computing device and the third computing device via a network.

13. The system of claim 10, wherein in response to receiving a valid retrieve instruction on the second computing device from the third computing device, the second computing device sends the private message data to the third computing device.

14. The system of claim 13, wherein the private message data is encrypted prior to transmission to the third computing device.

15. A method for transmitting a private message via a communication apparatus, the method comprising:

displaying, on a display of a communication device, a messaging screen of a messaging application having a message portion and a keyboard portion, the messaging screen further including a private messaging icon which, when selected, executes a private messaging application;

receiving private message data at the communication device, the private message data input into a private messaging field of a second communication device, and in response to receiving the private message data, displaying an indicator on the display of the communication apparatus that the private message data has been received;

detecting user selection of the private messaging icon;

displaying, within the keyboard portion of the messaging screen, at least one private message contained within the private message data on the display so that contents of the private message are obfuscated;

detecting user selection of a portion of the obfuscated contents; and displaying, at or near the user-selected portion of the obfuscated contents, an unobfuscated portion of the private message determined based on the user-selected portion of the obfuscated contents.

16. The method of claim 15, further comprising:

upon executing the private messaging application, displaying an indicator of sent private message data; and upon detecting selection of the indicator of the sent private message data, sending an instruction to at least a second computing device to delete the sent private message data.

17. The method of claim 15, wherein the private message icon is a tab, the tab located within at least a portion of the messaging screen.

18. The method of claim 15, wherein detecting user selection of the private messaging icon includes detecting continuous contact across a region of the messaging screen, the continuous contact originating in a predetermined region of the messaging screen, and terminating a predetermined distance from the predetermined region.

19. The method of claim 15, further comprising upon detecting selection of the private messaging icon, switching from displaying the indicator of the received private message data to displaying contact icons.

20. The method of claim 19, further comprising:

upon detecting a second user selection, the second user selection being of a contact icon, displaying a second private messaging screen configured to accept an input, the input including private message data; and storing the private message data and adding a tag to the stored input, marking the input as private message data.

21. The method of claim 20, further comprising transmitting the private message data to a second communication device.

* * * * *